(12) United States Patent
Jang et al.

(10) Patent No.: US 11,991,750 B2
(45) Date of Patent: May 21, 2024

(54) METHOD AND APPARATUS FOR TRANSMITTING AND RECEIVING DATA IN WIRELESS COMMUNICATION SYSTEM

(71) Applicant: Samsung Electronics Co., Ltd., Gyeonggi-do (KR)

(72) Inventors: Jaehyuk Jang, Gyeonggi-do (KR); Anil Agiwal, Gyeonggi-do (KR); Soenghun Kim, Gyeonggi-do (KR)

(73) Assignee: Samsung Electronics Co. Ltd (KR)

( * ) Notice: Subject to any disclaimer, the term of this patent is extended or adjusted under 35 U.S.C. 154(b) by 557 days.

(21) Appl. No.: 17/277,180

(22) PCT Filed: Sep. 18, 2019

(86) PCT No.: PCT/KR2019/012081
§ 371 (c)(1),
(2) Date: Mar. 17, 2021

(87) PCT Pub. No.: WO2020/060193
PCT Pub. Date: Mar. 26, 2020

(65) Prior Publication Data
US 2021/0378018 A1    Dec. 2, 2021

(30) Foreign Application Priority Data
Sep. 18, 2018   (KR) .................. 10-2018-0111668

(51) Int. Cl.
*H04W 74/0833*   (2024.01)
*H04W 28/02*   (2009.01)
*H04W 74/00*   (2009.01)

(52) U.S. Cl.
CPC ..... *H04W 74/0833* (2013.01); *H04W 74/006* (2013.01); *H04W 28/0278* (2013.01)

(58) Field of Classification Search
None
See application file for complete search history.

(56) References Cited

U.S. PATENT DOCUMENTS 9,258,830 B2    2/2016   Kim et al.
2020/0351938 A1   11/2020   Kim et al.

FOREIGN PATENT DOCUMENTS

KR    1020130032178    4/2013
KR    1020190085416    7/2019
(Continued)

OTHER PUBLICATIONS

InterDigital Communications, "2-Step Random Access Procedure", R1-1700703, 3GPP TSG RAN WG1 AH_NR Meeting, Jan. 16-20, 2017, 4 pages.
(Continued)

*Primary Examiner* — Walter J Divito
(74) *Attorney, Agent, or Firm* — The Farrell Law Firm, P.C.

(57) ABSTRACT

A method of performing a random access of a user equipment (UE) in a wireless communication system includes receiving configuration related to the random access from a base station (BS), when the random access is triggered, determining whether to perform a first random access procedure or a second random access procedure, based on the received configuration information related to the random access, and performing, based on a result of the determining, the random access according to the first random access procedure or the second random access procedure.

12 Claims, 18 Drawing Sheets

(56) References Cited

FOREIGN PATENT DOCUMENTS

| WO | WO 2012/134155 | 10/2012 | | |
|----|----------------|---------|---|---|
| WO | WO 2012/150809 | 11/2012 | | |
| WO | WO-2013042908 A1 * | 3/2013 | .......... | H04J 11/0056 |
| WO | WO 2018/132843 | 7/2018 | | |
| WO | WO 2020/032615 | 2/2020 | | |

OTHER PUBLICATIONS

International Search Report dated Jan. 2, 2020 issued in counterpart application No. PCT/KR2019/012081, 18 pages.
Oppo, "Two-steps RACH Procedure for NR-U", R2-1811067, 3GPP TSG-RAN WG2 Meeting #103, Aug. 20-24, 2018, 4 pages.
Vivo, "RAN2 Impacts of 2-Step RACH", R2-1811791, 3GPP TSG-RAN WG2 Meeting #103, Aug. 20-24, 2018, 3 pages.
Korean Office Action dated Aug. 11, 2022 issued in counterpart application No. 10-2018-0111668, 8 pages.
KR Notice of Allowance dated Feb. 22, 2023 issued in counterpart application No. 10-2018-0111668, 10 pages.

* cited by examiner (a)

(b)

(c)

METHOD AND APPARATUS FOR TRANSMITTING AND RECEIVING DATA IN WIRELESS COMMUNICATION SYSTEM

PRIORITY

This application is a National Phase Entry of PCT International Application No. PCT/KR2019/012081, which was filed on Sep. 18, 2019, and claims priority to Korean Patent Application No. 10-2018-0111668, which was filed on Sep. 18, 2018, the entire content of each of which is incorporated herein by reference.

TECHNICAL FIELD

The disclosure relates to a method of applying a 2-step random access in a wireless communication system.

BACKGROUND

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (e.g., a 60 GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of Things (IoT), where distributed elements such as objects exchange information with each other to process the information. Internet of Everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of a cloud RAN as the above-described big data processing technology may be an example of convergence of 5G communication technology and IoT technology.

As various services may be provided according to the foregoing and the development of wireless communication systems, methods for smoothly providing such services are required.

DESCRIPTION OF EMBODIMENTS

Technical Problem

The disclosure relates to a method and apparatus for smoothly providing various services.

Solution to Problem

A method of performing a random access of a user equipment (UE) in a wireless communication system includes receiving configuration related to the random access from a base station (BS), when the random access is triggered, determining whether to perform a first random access procedure or a second random access procedure, based on the received configuration information related to the random access, and performing, based on a result of the determining, the random access according to the first random access procedure or the second random access procedure.

A UE performing a random access in a wireless communication system includes a transceiver, and a controller configured to receive configuration information related to the random access from a BS, determine, when the random access is triggered, whether to perform a first random access procedure or a second random access procedure, based on the received configuration information related to the random access, and control, based on a result of the determining, the random access to be performed according to the first random access procedure or the second random access procedure.

Advantageous Effects of Disclosure

According to an embodiment of the disclosure, various services may be smoothly provided.

BEST MODE

Figure 1A:
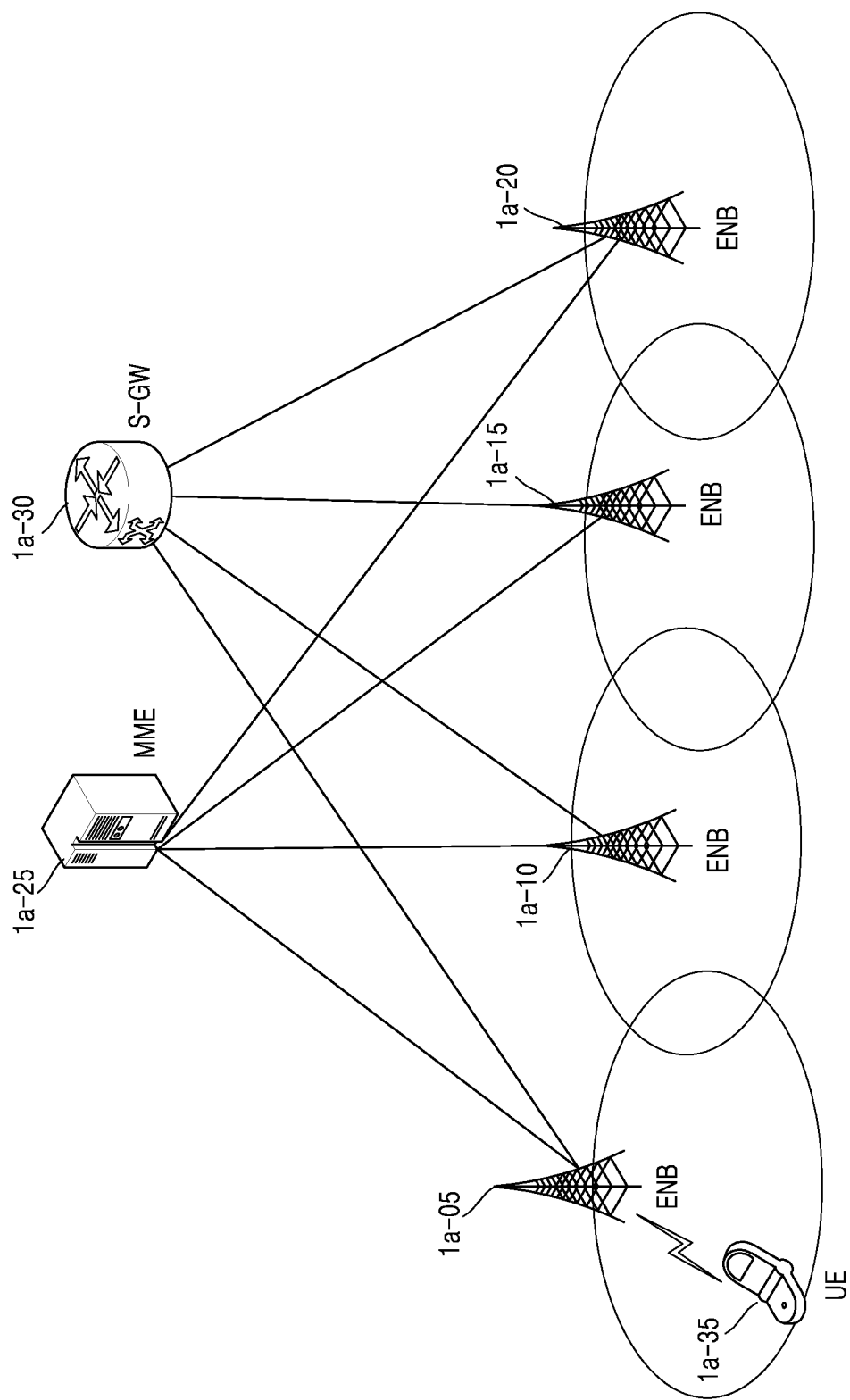
FIG. 1A is a diagram illustrating a configuration of a long term evolution (LTE) system according to an embodiment of the disclosure.

According to an embodiment of the disclosure, a method of performing a random access of a user equipment (UE) in a wireless communication system includes receiving configuration related to the random access from a base station (BS), when the random access is triggered, determining whether to perform a first random access procedure or a second random access procedure, based on the received configuration information related to the random access, and performing, based on a result of the determining, the random access according to the first random access procedure or the second random access procedure.

The determining of whether to perform the first random access procedure or the second random access procedure may include determining, based on the received configuration information related to the random access, whether to apply the first random access procedure or the second random access procedure to a logical channel for which the random access is triggered.

The configuration information related to the random access may include information about whether to perform the first random access procedure or the second random access procedure on at least one logical channel.

The configuration information related to the random access may include at least one of resource information for transmitting a first message of the first random access procedure or physical random access channel (PRACH) resource information for performing the second random access procedure.

The first random access procedure may include a 2-step random access procedure, and the second random access procedure may include a 4-step random access procedure.

The UE may be in a radio resource control (RRC) mode with respect to the BS.

The performing of the random access may include including a buffer status report (BSR) in a message for the random access and transmitting the message to the BS.

According to an embodiment of the disclosure, a UE performing a random access in a wireless communication system includes a transceiver, and a controller configured to receive configuration information related to the random access from a BS, determine, when the random access is triggered, whether to perform a first random access procedure or a second random access procedure, based on the received configuration information related to the random access, and control, based on a result of the determining, the random access to be performed according to the first random access procedure or the second random access procedure.

The controller may be configured to determine, based on the received configuration information related to the random access, whether to apply the first random access procedure or the second random access procedure to a logical channel for which the random access is triggered.

The configuration information related to the random access may include information about whether to perform the first random access procedure or the second random access procedure on at least one logical channel.

The configuration information related to the random access may include at least one of resource information for transmitting a first message of the first random access procedure or PRACH resource information for performing the second random access procedure.

The first random access procedure may include a 2-step random access procedure, and the second random access procedure may include a 4-step random access procedure.

The UE may be in a connected mode with respect to the BS.

The controller may be configured to control a BSR to be included in a message for the random access and control the message to be transmitted to the BS.

MODE OF DISCLOSURE

Hereinafter, embodiments of the disclosure will be described in detail with reference to the accompanying drawings. In the following description of the disclosure, detailed descriptions of well-known functions or configurations will be omitted because they would unnecessarily obscure the subject matters of the disclosure. Also, terms to be described below may be defined in consideration of functions in the disclosure, and may vary according to intentions or known methods of operators and users. Therefore, the definitions the terms should be made based on the contents throughout the specification.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-executable or computer-readable memory capable of directing a computer or another programmable data processing apparatus to implement a function in a particular manner, and thus, the instructions stored in the computer-executable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

The term "module" (or sometimes "unit") as used herein refers to a software or hardware component, such as field programmable gate array (FPGA) or application specific integrated circuit (ASIC), which performs some functions. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with a smaller number of components and "units", or may be divided into additional components and "units". Furthermore, the components and "units" may be embodied to reproduce one or more central processing units (CPUs) in a device or security multimedia card. In embodiments of the disclosure, the module may include one or more processors.

In the disclosure, a downlink (DL) denotes a wireless transmission path of a signal that a BS transmits to a UE, and an uplink (UL) denotes a wireless transmission path of a signal that the UE transmits to the BS. In addition, hereinbelow, an LTE or LTE-Advanced (LTE-A) system may be described as an example; however, the embodiments of the disclosure may be applied to other communication systems having a similar technical background or channel forms. For example, a 5G mobile communication technology (NR) that is developed after LTE-A may be included in a system to which the embodiments of the disclosure may be applied, and the 5G described below may be a concept that includes the existing LTE, LTE-A, and other similar services. In addition, the disclosure may be applied to other communication systems through some modifications without significantly departing from the scope of the disclosure at the determination of one of ordinary skill in the art.

In the following description, terms for identifying access nodes, terms referring to network entities, terms referring to messages, terms referring to interfaces between network entities, terms referring to various identification information, and the like are illustrated for convenience of description. Thus, the disclosure is not limited to the terms described below and other terms referring to objects having equivalent technical meanings may be used.

Hereinafter, for convenience of description, the disclosure may use terms and names defined in LTE and NR standards that are the latest standards defined by the $3^{rd}$ Generation Partnership Project (3GPP) group among the current communication standards. However, the disclosure is not limited to those terms and names and may also be similarly applied to systems according to other standards. Particularly, the disclosure may be applied to 3GPP NR (5G mobile communication standards).

FIG. 1A is a diagram illustrating a configuration of an LTE system according to an embodiment of the disclosure. The drawings described with reference to FIG. 1A may also be applied to an NR system.

Referring to FIG. 1A, a wireless communication system may include a plurality of eNBs 1a-05, 1a-10, 1a-15, and 1a-20, a mobility management entity (MME) 1a-25, and a serving gateway (S-GW) 1a-30. A user equipment (hereinafter, "UE" or "terminal") 1a-35 may access an external network through the eNBs 1a-05, 1a-10, 1a-15, and 1a-20 and the S-GW 1a-30.

The eNBs 1a-05, 1a-10, 1a-15, and 1a-20 are access nodes of a cellular network and provide a wireless access to UEs accessing the network. That is, in order to service traffic of users, the eNBs 1a-05, 1a-10, 1a-15, and 1a-20 may collect and schedule status information such as buffer status of UEs, available transmission power status, and/or channel status, thereby supporting connection between UEs and a core network (CN).

The MME 1a-25 is a device capable of performing a mobility management function and a control function on a UE, and may be connected to a plurality of eNBs.

The S-GW 1a-30 is a device that is capable of providing a data bearer.

In addition, the MME 1a-25 and the S-GW 1a-30 may perform authentication, bearer management, or the like for the UE accessing the network and may process packets received from the eNBs 1a-05, 1a-10, 1a-15, and 1a-20 or packets to be transmitted to the eNBs 1a-05, 1a-10, 1a-15, and 1a-20.

Figure 1B:
FIG. 1B is a diagram illustrating a radio protocol architecture in LTE and New Radio (NR) systems, according to an embodiment of the disclosure.

FIG. 1B is a diagram illustrating a radio protocol architecture in LTE and NR systems according to an embodiment of the disclosure.

Referring to FIG. 1B, a radio protocol of the LTE system may include packet data convergence protocols (PDCPs) 1b-05 and 1b-40, radio link controls (RLCs) 1b-10 and 1b-35, and medium access controls (MAC) 1b-15 and 1b-30 in each of the UE and the eNB.

The PDCPs 1b-05 and 1b-40 may perform an operation of compression/decompression of an Internet protocol (IP) header. The RLCs 1b-10 and 1b-35 may reconfigure a PDCP packet data unit (PDU) in an appropriate size. The MAC 1b-15 and 1b-30 may be connected to several RLC layers configured in one UE and may perform an operation of multiplexing RLC PDUs into MAC PDUs and demultiplexing RLC PDUs from MAC PDUs. Physical layers (PHY) 1b-20 and 1b-25 may perform an operation of channel-coding and modulating a higher layer data, generating the higher layer data into orthogonal frequency division multiplexing (OFDM) symbols, and transmitting the OFDM symbols on a radio channel, or may perform an operation of demodulating the OFDM symbols received through the radio channel, channel-decoding the demodulated OFDM symbol, and transmitting the channel-decoded OFDM symbol to the higher layer. Also, a hybrid automatic repeat request (HARQ) is used in the physical layer for additional error correction, and a receiving end may transmit information about whether a packet transmitted from a transmitting end is received, in 1 bit. This may be referred to as HARQ ACK/NACK information. In the case of LTE, DL HARQ ACK/NACK information with respect to UL data transmission may be transmitted by using a physical HARQ indicator channel (PHICH), and in the case of NR, it may be determined whether retransmission is necessary or it is possible to perform retransmission, through scheduling information of a corresponding UE in a physical dedicated control channel (PDCCH) that is a channel on which DL/UL resource allocation or the like is transmitted. This may be because an asynchronous HARQ is applied in NR. UL HARQ ACK/NACK information about DL data transmission may be transmitted through a physical UL control channel (PUCCH) or a physical UL shared channel (PUSCH).

Meanwhile, in LTE, a cell in an eNB using a primary carrier is referred to as a primary cell (PCell), and a cell in an eNB using a subcarrier is referred to as a secondary cell (SCell).

As described below, in general, the PUCCH is transmitted in a UL of the PCell; however, when supported by a UE, the eNB may additionally transmit the PUCCH to the UE in a SCell, which may be referred to as a PUCCH SCell.

Although not shown in the drawings, radio resource control (RRC) layers exist above PDCP layers of the UE and the BS, respectively, and the RRC layers may exchange access and measurement-related configuration control messages for radio resource control.

Meanwhile, the PHY layer may correspond to one or more frequencies/carriers. A technology by which one BS simultaneously configures and uses a plurality of frequencies may be referred to as carrier aggregation (CA). The CA may increase the amount of transmission by the number of subcarriers by additionally using a primary carrier and one or a plurality of subcarriers, instead of using only one carrier, for communication between the UE and the BS (E-UTRAN NodeB, eNB).

Figure 1C:
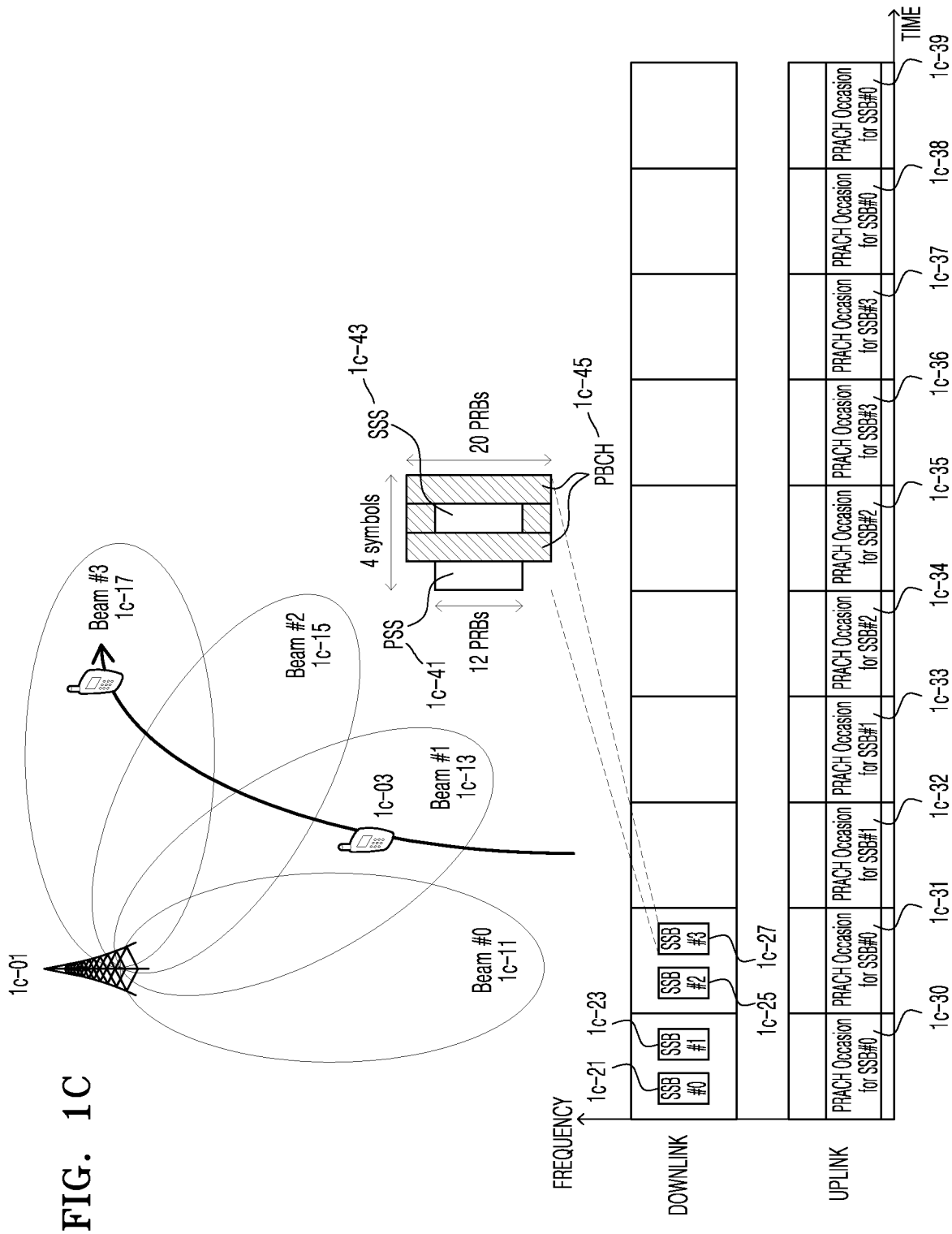
FIG. 1C is a diagram for explaining a configuration of downlink and uplink channel frames when a beam-based communication is performed in an NR system.

FIG. 1C is a diagram illustrating an example of DL and UL channel frame structures when a beam-based communication is performed in an NR system.

A BS 1c-01 may transmit a signal in a form of beams 1c-11, 1c-13, 1c-15, and 1c-17 for broader coverage or to transmit a stronger signal. Accordingly, a UE 1c-03 within a cell has to transmit and receive data using a certain beam (in the drawings, "beam #1 1c-13") received from the BS.

Meanwhile, a state of a UE is divided into an idle mode (RRC_IDLE) and a connected mode (RRC-CONNECTED) according to whether the UE is connected to the BS. Accordingly, the BS cannot detect a location of a UE in the idle mode RRC_IDLE.

In a case where a UE in the idle mode RRC_IDLE is to be transitioned to the connected mode, the UE receives synchronization signal blocks (SSB) 1c-21, 1c-23, 1c-25, and 1c-27 transmitted from the BS.

The SSB is an SSB signal that is periodically transmitted according to an interval configured by the BS, and each SSB is divided into a primary synchronization signal (PSS) 1c-41, a secondary synchronization signal (SSS) 1c-43, and a physical broadcast channel (PBCH).

In FIG. 1C, a scenario in which SSB is transmitted on each beam is assumed. Specifically, it is assumed that an SSB #0 1c-21 is transmitted by using a beam #0 1c-11, an SSB #1 1c-23 is transmitted by using a beam #1 1c-13, an SSB #2 1c-25 is transmitted by using a beam #2 1c-15, and an SSB #3 1c-27 is transmitted by using a beam #3 1c-17.

In FIG. 1C, a situation in which the UE in the idle mode is positioned in beam #1, but even when the UE in the connected mode performs a random access, the UE may select an SSB that is received at a time when the random access is performed.

Accordingly, the UE may receive SSB #1 transmitted on beam #1. When the UE receives SSB #1, the UE may obtain a physical cell identifier (PCI) of the BS according to PSS and SSS. In addition, by receiving the PBCH, the UE may identify not only an identifier of an SSB currently received (that is, #1) and at which position in a 10 ms frame the SSB is received, but also a system frame number (SFN) having a 10.24 second-interval in which the SSB is present.

In addition, the PBCH may include master information block (MIB) therein, and the MIB may inform in which position system information block type 1 (SIB1), which broadcasts more detailed cell configuration information, may be received.

When the UE receives SIB1, the UE may identify a total number of SSBs transmitted by the BS, and the UE may identify a position of a physical random access channel (PRACH) occasion that may perform a random access to transition to the connected mode state. Alternatively, the UE may identify a position of the PRACH occasion capable of transmitting a preamble, which is a specially designed physical signal for UL synchronization. In an embodiment described with reference to FIG. 1C, a scenario in which the location of a PRACH occasion is allocated every 1 ms is assumed, and 1c-30 through 1c-39 are shown.

In addition, based on the information described above, the UE may identify which PRACH occasion is mapped to which SSB index among PRACH occasions. For example, in FIG. 1C, a scenario in which the location of the PRACH occasion is allocated every 1 ms is assumed, and a scenario in which ½ SSB is allocated per PRACH occasion (that is, two PRACH occasions per SSB) is assumed. Accordingly, a scenario in which two PRACH occasions are allocated for each SSB from the start of the PRACH occasion starting according to an SFN value is shown. That is, 1c-30 and 1c-31 may be allocated for SSB #0, and 1c-32 and 1c-33 may be allocated for SSB #1. After the PRACH occasion is configured for all SSBs, the PRACH occasion may be allocated again for the first SSB 1c-38 and 1c-39.

Accordingly, the UE recognizes a position of the PRACH occasion (1c-32) (1c-33) for SSB #1, and accordingly, transmits a random access preamble to a fastest PRACH occasion at a current time point among the PRACH occasions 1c-32 and 1c-33 corresponding to SSB #1. Because the BS receives the preamble in PRACH occasion 1c-32, the BS may recognize that the UE has selected SSB #1 to transmit the preamble, and when a subsequent random access is performed, data may be transmitted or received on the beam.

Even when a UE in the connected state moves to a target BS from a current (source) BS due to handover, etc., the UE performs a random access on the target BS, and performs an operation of selecting an SSB to transmit a random access as described above.

Furthermore, in the handover of the UE, the BS may transmit a handover command so that the UE moves from the source BS to the target BS. In this case, the BS may allocate a UE-dedicated random access preamble identifier to a message for each SSB of the target BS so as to be used when a random access is performed on the target BS.

A BS may not allocate dedicated random access preamble identifiers to all beams (according to a current location of a UE or the like), and thus, dedicated random access preambles may not be allocated to some SSBs. For example, the dedicated random access preambles may be allocated only to Beams #2 and #3.

In a case where a dedicated random access preamble is not allocated to an SSB the UE selected for transmission of a preamble, the UE may randomly select a contention-based random access preamble and then perform the random access. For example, in the present drawing, after the UE is positioned in Beam #1 for a first time and then performed a random access but failed, when the UE transmits a random access preamble again, the UE may be positioned in Beam #3 and transmit a dedicated preamble.

In other words, when a retransmission of a preamble occurs during one random access procedure, according to whether a dedicated random access preamble is allocated to an SSB selected at every transmission of the preamble, a contention-based random access procedure and a contention-free random access procedure may coexist.

Figure 1D:
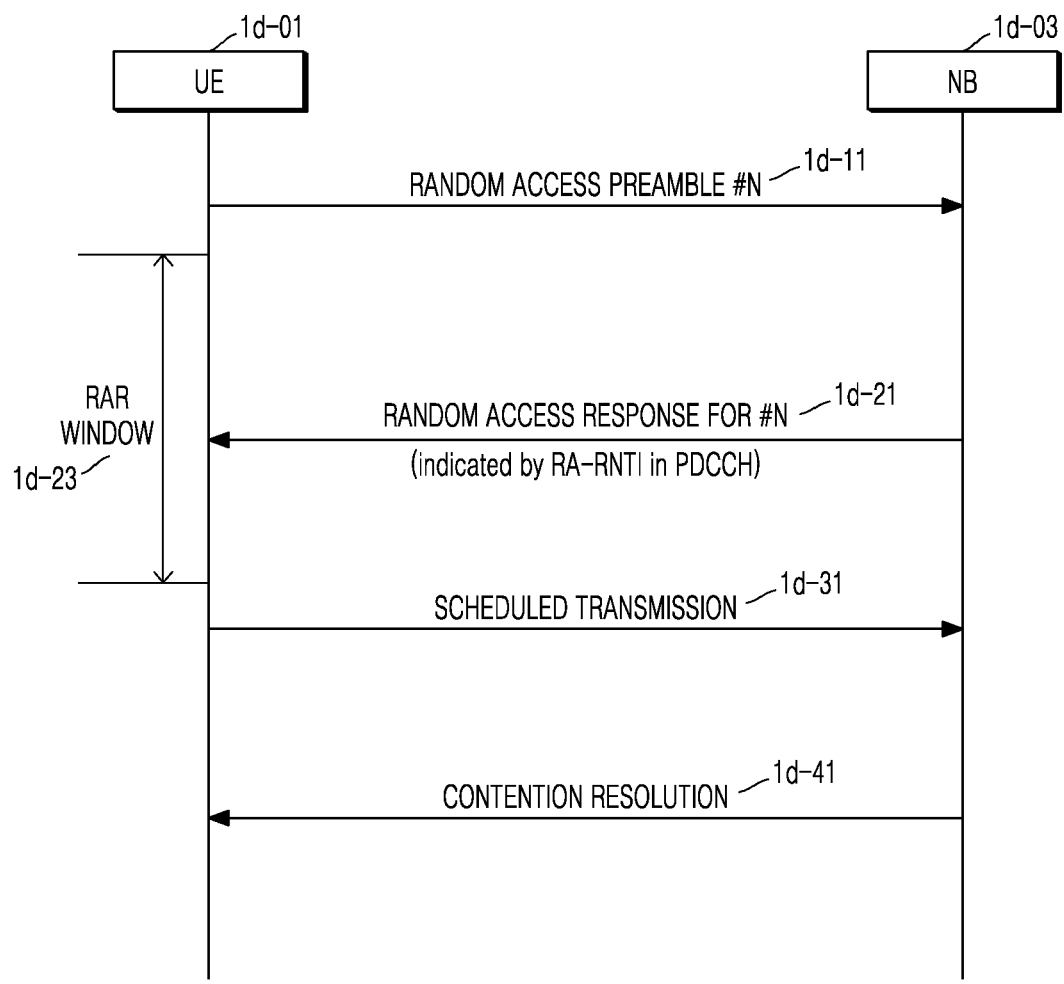
FIG. 1D is a diagram for explaining a procedure for performing, by a user equipment (UE), a contention-based 4-step random access to a base station (BS).

FIG. 1D is a diagram illustrating a contention-based 4-step random access procedure that a UE 1d-01 performs on a BS 1d-03 in various cases in which initial access, re-access, handover, and random access are required.

The UE 1d-01 may select a PRACH according to FIG. 1C described above, and transmit a random access preamble to a corresponding PRACH in order to access the BS 1d-03, in operation 1d-11.

A case where one or more UEs simultaneously transmit a random access preamble on a PRACH resource may occur. The PRACH resource may span one subframe, or only some symbols within one subframe may be used.

Information about the PRACH resource may be included in system information broadcast by the BS. According to the system information, the UE 1d-01 may identify on which time frequency resource the preamble is to be transmitted. In addition, the random access preamble is a specific sequence specially designed to enable reception even if transmitted before being completely synchronized with the BS, and may have a plurality of preamble identifiers (indices) according to a standard. When there are multiple preamble identifiers, the preamble transmitted by the UE may be randomly selected by the UE, or may be a specific preamble designated by the BS.

When the BS receives the preamble, the BS transmits a random access response (hereinafter referred to as RAR) message to the UE, in operation 1d-21. The RAR message includes identifier information of the preamble used in operation 1d-11, UL transmission timing correction information, UL resource allocation information to be used in operation 1d-31, and temporary UE identifier information. For example, the identifier information of the preamble is transmitted to indicate which preamble response message is the RAR message when a plurality of UEs transmit different preambles to attempt random access in operation 1d-11, for example.

The UL resource allocation information is detailed information of a resource to be used by the UE in operation 1d-31, and includes a physical location and size of the resource, a decoding and coding scheme (MCS) used during transmission, and power adjustment information during transmission.

The temporary UE identifier information (temporary cell RNTI (TC RNTI)) is a value transmitted because the UE does not have an identifier allocated by the BS for communication with the BS when the UE that has transmitted the preamble makes initial access.

The RAR message should be transmitted within a preset period starting from a preset time after transmitting the preamble, and the preset period is referred to as an 'RAR window'. The RAR window starts from a point in time when a preset time elapses after transmitting the first preamble. The preset time may have a subframe unit (1 ms) or a smaller value. In addition, a length of the RAR window may be a preset value configured by the BS for each PRACH resource or for each set of one or more PRACH resources in the system information message broadcast by the BS.

When the RAR window is transmitted, the BS schedules the RAR message through the PDCCH, and the scheduling information is scrambled by using a random access-radio network temporary identifier (RA-RNTI). The RA-RNTI is mapped with the PRACH resource used to transmit the message 1d-11, and the UE that has transmitted the preamble to the specific PRACH resource attempts to receive P based on the RA-RNTI to determine whether there is a corresponding RAR message. In other words, when the RAR message is a response to the preamble transmitted in operation 1d-11 by the UE, the RA-RNTI used in the RAR message scheduling information includes information on the corresponding 1d-11 transmission. For this purpose, RA-RNTI may be calculated by using the following equation:

$$RA\text{-}RNTI = 1 + s\_id + 14 \times t\_id + 14 \times 80 \times f\_id + 14 \times 80 \times 8 \times ul\_carrier\_id$$

In this regard, s_id is an index corresponding to the first OFDM symbol from which the preamble transmission started in operation 1d-11, and has a value of 0 s_id<14 (i.e., the maximum number of OFDMs in one slot). Also, t_id is an index corresponding to a first slot from which the preamble transmission started in operation 1d-11 and has a value of 0≤t_id<80 (i.e., the maximum number of slots in one system frame (10 ms). Also, f_id indicates the number of PRACH resource the preamble transmitted in operation 1d-11 is transmitted on the frequency, which has a value of 0≤f_id<8 (that is, the maximum number of PRACHs on the frequency within the same time). ul_carrier-id is a factor for distinguishing whether a preamble is transmitted in a normal UL (NUL) (0 in this case) or a preamble is transmitted in a supplementary UL (SUL) (1 in this case) when two carriers are used in UL for one cell.

The UE receiving the RAR message transmits other messages according to above-described various purposes to the resource allocated to the RAR message, in operation 1d-31. This message is a third message transmitted in FIGS. 1D and 1s also referred to as Msg3. In other words, the preamble of operation 1d-11 is called Msg1, and the RAR of operation 1d-21 is called Msg2.

As an example of Msg3 transmitted by the UE, an RRCConnectionRequest message, which is a message of the RRC layer in case of initial access, an RRCConnectionReestablishmentRequest message in case of re-access, and an RRCConnectionReconfigurationComplete message during handover, are transmitted. Alternatively, a buffer status report (BSR) message for resource request may be transmitted.

Thereafter, in the case of initial transmission, that is, when Msg3 does not include BS identifier information previously allocated to the UE, the UE may receive a contention resolution message from the BS, in operation 1d-41. The contention resolution message includes a content transmitted by the UE in Msg3 as it is, so that even when there are a plurality of terminals that select the same preamble in operation 1d-11, it is possible to inform which terminal the response is related to.

Meanwhile, a scenario in which the above-described 5G system is operated in an unlicensed band may be considered. The term "unlicensed band" means a frequency band that anyone may freely use without a separate license in the relevant frequency, for example, 2.4 GHz or 5 GHz, in the regulatory allowance in the band. Wireless LAN, Bluetooth, or the like communicate using the corresponding frequency.

Meanwhile, in order to perform communication in the unlicensed band, data has to be transmitted and received according to regulations established by each country. In more detail, according to the regulations, before a communication device performs transmission in the unlicensed band, the communication device should 'listen' to determine whether the unlicensed band is occupied by another communication device, and when the communication device determines that the unlicensed band is not occupied, the communication device should perform 'transmission'. In this way, the method of listening and transmitting when it is not occupied is called listen-before-talk (LBT). Regulations that have to perform LBT for each country and unlicensed band are determined, and communication devices have to perform LBT when communicating in an unlicensed band according to these regulations.

In general, there are largely Type 1 and Type 2 types in LBT.

Figure 1E:
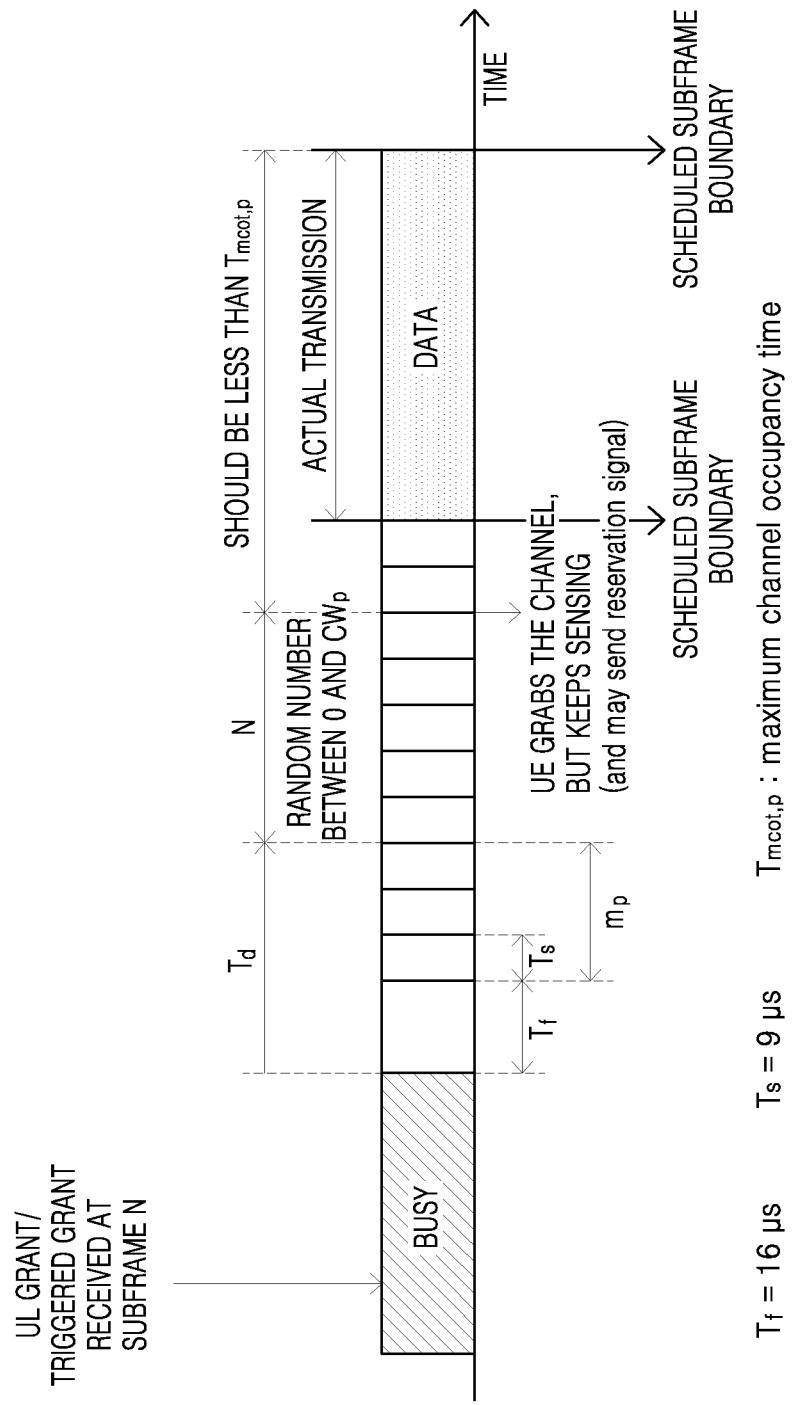
FIG. 1E is a diagram describing listen before talk (LBT) type 1.

FIG. 1E is a diagram for describing LBT Type 1.

LBT Type 1 is a method of randomly determining a time period in which whether other neighboring devices are transmitting is listened before transmission, and transmitting when the channel is not occupied for the random time period. At this time, the communication device first listens for a fixed amount of a time $T_d$ and, when unoccupied, the communication device determines whether the channel is not occupied for a random time N.

In this case, the communication device may differentially determine how to determine the values of $T_d$ and N according to priorities and importances of traffics, and there may be a total of four different classes. The class may be referred to as a channel access priority class (CAPC).

Also, according to the CAPC, it has a time length of $T_d=16+m_p*9$ (µs) and has N=random (0, $CW_p$)*9 (µs), and the CW value may start from $CW_{min,p}$ and increase about twice whenever transmission fails and may have a maximum value of $CW_{max,p}$. For example, when the communication device performs LBT by using a CAPC of 3, $T_d$ may have a length of 16+3*9=43 µs and N may have a random value selected between 0 and 15 in the case of initial transmission, and for example, when 7 is selected, N may be 7*9=63 µs and thus the communication device may transmit data when the channel is unoccupied for 106 µs.

TABLE 1

| Channel Access Priority Class (p) | $m_p$ | $CW_{min, p}$ | $CW_{max, p}$ | $T_{mcot, p}$ | allowed $CW_p$ sizes |
| --- | --- | --- | --- | --- | --- |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In the above example (that is, when 7 is selected for N), when it is determined that the channel is occupied by another device (i.e., when a received signal strength indicator (RSSI) is greater than or equal to a certain threshold value) while determining whether the channel is unoccupied (e.g., when 3 out of 7 has passed and 4 remains), the UE may wait until the occupancy of the channel ends and still wait for $T_d$ again and then perform transmission after determining whether the channel is unoccupied for the remaining time of 4.

As shown in [Table 1], an LBT scheme with low CAPC is used when transmitting high-priority traffic.

Figure 1F:
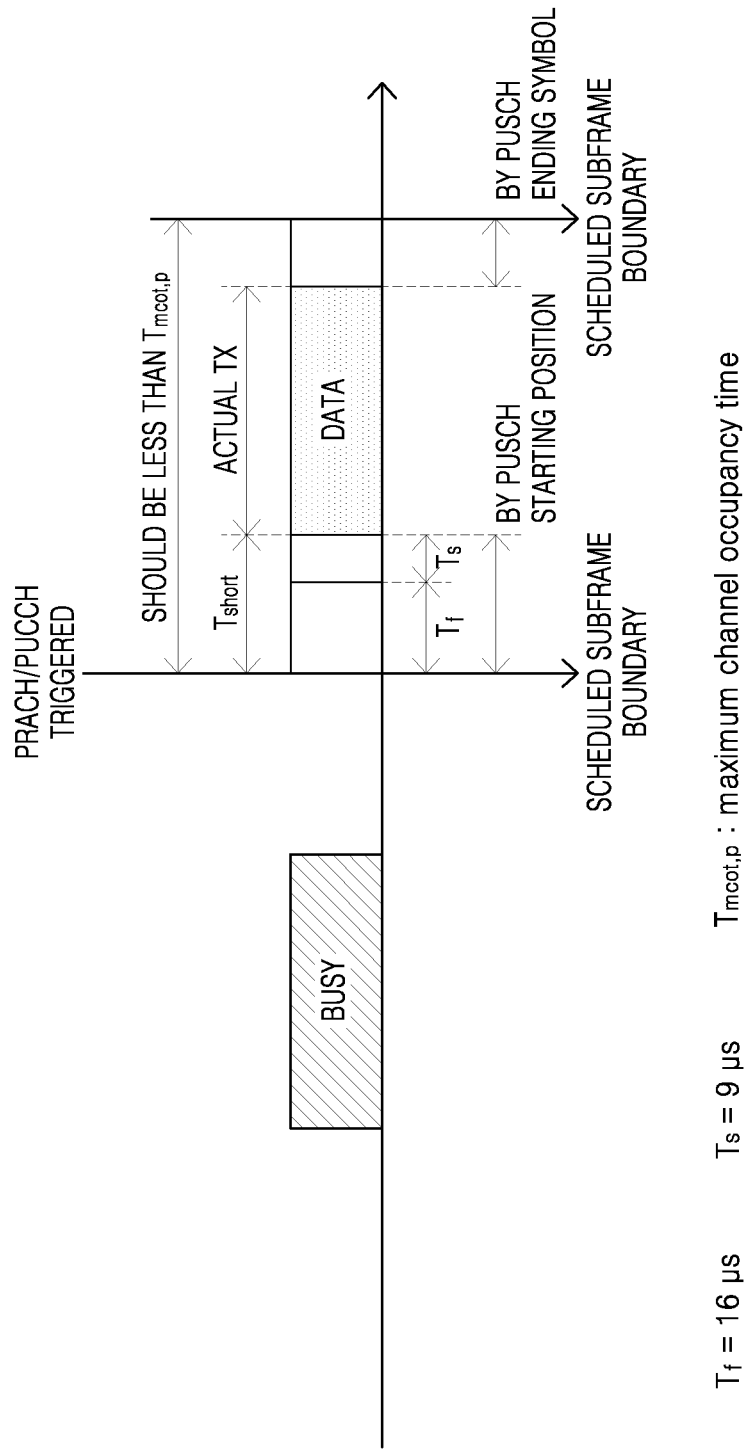
FIG. 1F is a diagram describing LBT type 2.

FIG. 1F is a diagram for describing LBT Type 2.

LBT Type 2 refers to a scheme by which a time period is fixed, in which whether other neighboring devices are transmitting is listened before transmission, and when the channel is not occupied for the fixed time, a communication device immediately performs transmission. In other words, in FIG. 1F, when the communication device needs to transmit, the communication device listens to (senses) the channel for a fixed period of time $T_{short}$ (=$T_f$+$T_s$) and, when the communication device determines that the channel is not occupied, the communication device transmits data immediately. This is an LBT scheme that may be used when transmitting signals with very high priority. Accordingly, because the above-described random access preamble (1d-11 of FIG. 1D) and the PUCCH described above with reference to FIG. 1D are signals of high importance, they may be transmitted using the LBT scheme.

As described above, when the random access scheme described in FIG. 1D is performed, in consideration of the scenario of operating the 5G system in an unlicensed band, LBT has to be performed for each transmission.

Accordingly, there is a problem in that the random access is much delayed, and for this purpose, a method of reducing the above-described 4-step random access procedure to a 2-step random access procedure may be considered.

Figure 1G:
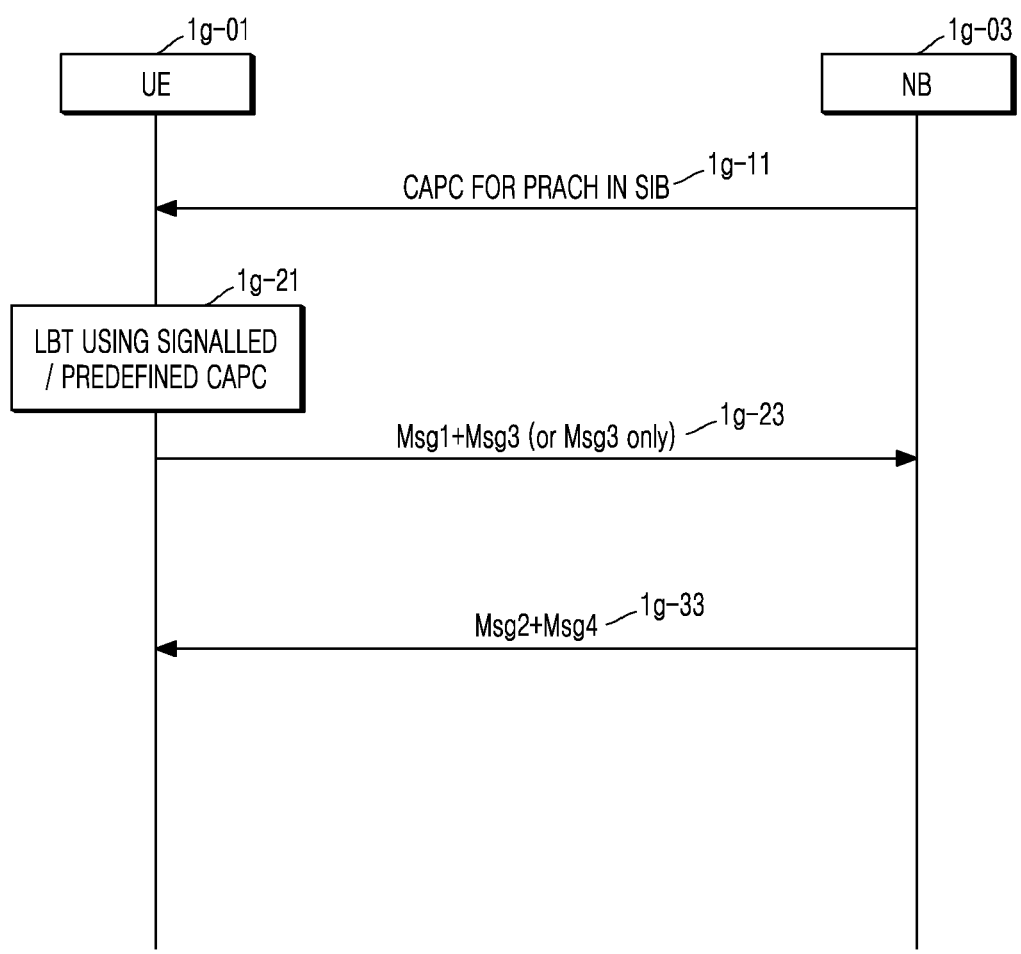
FIG. 1G is a diagram illustrating a 2-step random access procedure of a UE and a BS.

FIG. 1G is a diagram illustrating a 2-step random access procedure of a UE and a BS.

In order to reduce the 4-step random access procedure to 2-step random access procedure, in the first message 1g-23 transmitted, the UE may simultaneously transmit preambles Msg1 1d-11 and Msg3 1d-31 of the 4-step random access procedure to the BS. Alternatively, when the cell size is small and there is no need to perform UL synchronization, the UE may omit Msg1 of the 4-step random access procedure and transmit Msg3.

Thereafter, the BS receiving the message according to operation 1g-23 may simultaneously transmit the information and the Msg4 message provided in the Msg2 (RAR) 1d-21 of the random access procedure.

Meanwhile, considering a procedure of performing the 2-step random access procedure in the unlicensed band, when transmitting the first message 1g-23 of the 2-step random access procedure, it is necessary to determine which LBT is to be applied and transmitted.

When the BS allocates a resource to transmit the first message of the 2-step random access procedure, the BS indicates what LBT type the UE should use when transmitting on the corresponding resource, and when Type 1 is indicated, what CAPC the UE should use, in operation 1g-11.

In addition, even in the 4-step random access procedure, the BS may indicate what LBT type the UE should use when allocating PRACH resources and transmitting the preamble, and what CAPC should the UE use when Type 1 is indicated.

When the BS does not separately indicate which LBT to use when transmitting the first message, the UE may perform transmission in a predetermined LBT scheme, for example, may perform transmission using a scheme of LBT type 2 described above.

Meanwhile, as described with reference to FIG. 1D, the UE may perform a random access for various purposes. For example, the UE may perform a random access to transmit a message for connection while not yet connected to the BS, or to transmit a message for recovering the connection when the connection is released due to an error. The same message belongs to a common control channel (CCCH).

Control messages belonging to the CCCH include RRCSetupRequest (when transitioning from idle mode (RRC_IDLE) to connected mode), RRCResumeRequest (when transitioning from inactive mode (RRC_INACTIVE) to connected mode), RRCReestablishmentRequest (when connection is restored), and RRCSystemInfoRequest (when requesting system information to broadcast a BS).

When the UE performs a two-step random access for every CCCH transmission, the problem of delaying the random access procedure due to collision between messages may be further strengthened. Accordingly, it is possible for the UE to perform the random access only for a preset message among messages belonging to the CCCH.

For example, because the priority of a message such as RRCReestablishmentRequest transmitted during connection recovery or RRCResumeRequest used when transitioning from the inactive mode to the connected mode is relatively high, the UE may perform the 2-step random access when random access is required. Because a message such as RRCSystemInfoRequest may not have a significant problem even when a delay occurs, the UE may perform a random access in 4-step random access instead of 2-step random access to transmit the message. Alternatively, when it is determined that the priority of CCCH messages is higher than that of other dedicated control channels and dedicated traffic channels, which will be described below, the UE may transmit using 2-step random access for every CCCH transmission.

Thereafter, when the UE normally accesses the BS, the UE may transmit and receive a message belonging to the dedicated control channel (DCCH) and the dedicated traffic channel (DTCH) in the connected mode (RRC_CONNECTED). The UE has to transmit, to the BS, a 'buffer status report (BSR)' message indicating that there is data to be transmitted from the UE to the BS via a current UL, and request UL resource allocation. For this purpose, the BS may allocate, to the UE, a dedicated PUCCH resource for transmission of a 'scheduling request (SR)' for a specific logical channel. By doing so, when the BS receives the SR from the UE through the PUCCH, the BS allocates an UL resource for transmission of the BSR, and when the UE transmits the BSR on the UL resource, the BS identifies the buffer status of the UE and allocates UL resources for data.

Meanwhile, when the BS does not allocate SR for a specific logical channel, or even when the BS allocated the SR and the UE transmitted the SR for the maximum number of transmissions of the SR but the UE could not receive a UL resource and thus cannot transmit BSR, the UE may perform a random access and then may transmit Msg3 including BSR. Here, the specific logical channel is a logical concept classified according to a type of control and common data.

Accordingly, in a case where the UE accesses the BS and then configures respective logical channels for transmission of data belonging to the dedicated control channel and the dedicated traffic channel, when the UE performs a random access for transmission on the corresponding logical channel, the BS may configure whether the US can perform the 2-step random access for each channel. For example, for a logical channel for a DCCH (for example, a first control radio bearer, a second control radio bearer, a third control radio bearer) and a logical channel for traffic having a high priority, the BS may configure the 2-step random access to be possible.

Accordingly, when the UE in the connected mode performs a random access, the UE performs the 2-step random access or the 4-step random access depending on whether or not the 2-step random access is allowed for the logical channel for which the random access is triggered.

Figure 1H:
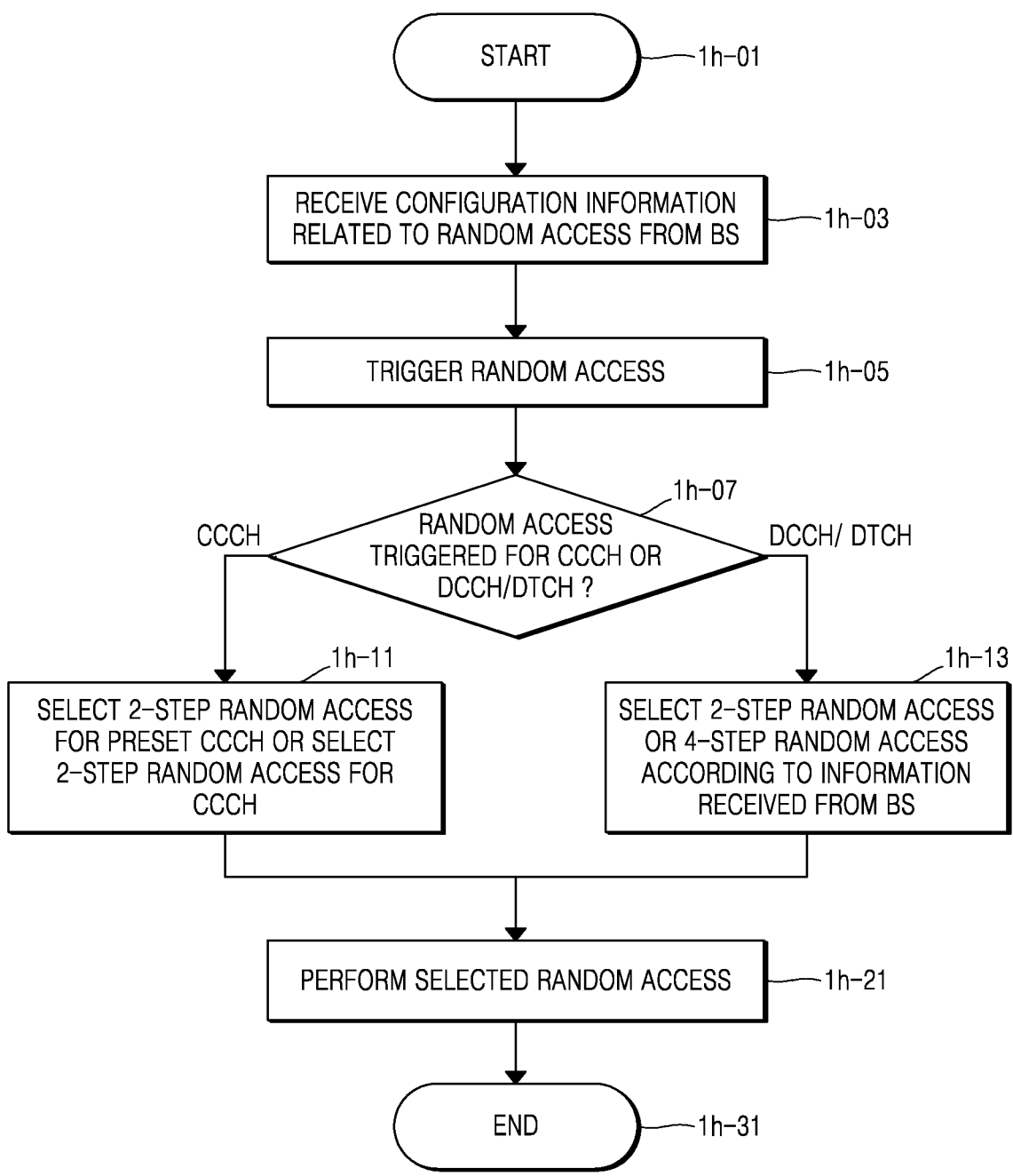
FIG. 1H is a flowchart of an operation of a UE performing a random access by selecting a 2-step random access or a 4-step random access.

FIG. 1H is a diagram illustrating a flowchart of performing a random access by selecting a 2-step random access or a 4-step random access when a UE performs the random access.

The UE receives, from the BS, configuration information related to random access, in operation 1h-03. The configuration information may include a PRACH resource for the above-described 4-step random access, a resource for transmission of a first message of the 2-step random access, an LBT type to be applied when using the resource, or the like. In FIG. 1H, it is assumed that the BS allocates resources for transmission of the first message of the 2-step random access.

Thereafter, when the random access is triggered in the UE in operation 1h-05, the UE determines whether the random access is triggered to transmit a message belonging to the CCCH or to transmit a message belonging to the DCCH or DTCH, in operation 1h-07.

When random access is triggered to transmit a message belonging to the CCCH, as described with reference to FIG. 1G, the UE may select to perform the two-step random access only when transmitting a preset CCCH message determined to have a high priority, or perform the 2-step random access for all CCCH messages, in operation 1h-11.

When random access is triggered to transmit a message belonging to the DCCH or DTCH, the UE may determine whether the UE can perform the 2-step random access on the corresponding logical channel, according to configuration information received from the BS. When allowed according to the configuration information, the UE may select to perform the 2-step random access, otherwise the UE may select to perform the 4-step random access, in operation 1h-13.

Thereafter, the UE may perform the above-described 2-step or 4-step random access according to the selected random access type, in operation 1h-21. In this case, when the operation is performed in the unlicensed band, the UE may determine which LBT is used to transmit the first message (that is, 1d-11 in FIGS. 1D and 1g-23 in FIG. 1G) in the selected 2-step or 4-step random access. As described above in FIG. 1G, this may be indicated when configuring a random access resource from system information transmitted by the BS. Alternatively, the UE may perform a random access by transmitting the first message by applying a predetermined LBT type (for example, LBT Type 2).

Figure 1I:
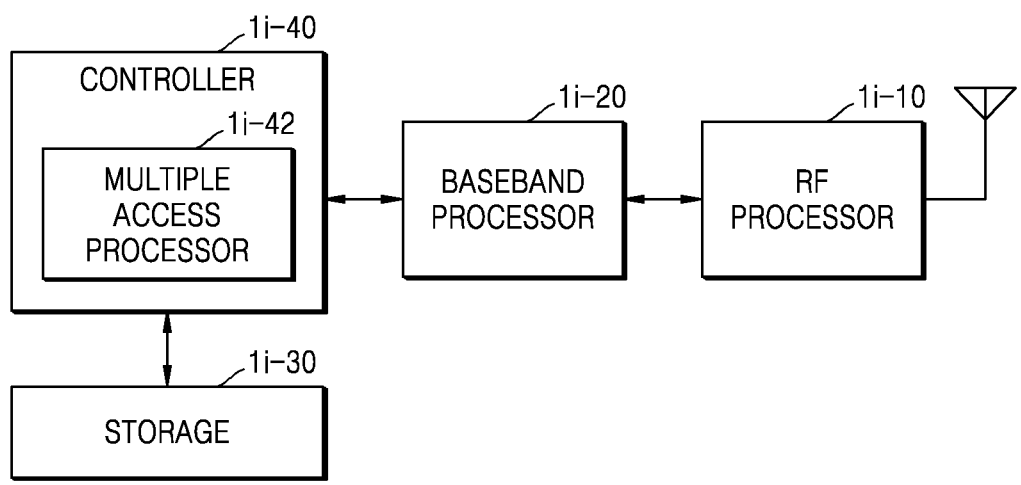
FIG. 1I is a block diagram of a UE in a wireless communication system, according to an embodiment of the disclosure.

FIG. 1I is a diagram illustrating a block configuration of a UE in a wireless communication system according to an embodiment of the disclosure.

According to an embodiment of the disclosure, the UE may include a radio frequency (RF) processor 1i-10, a baseband processor 1i-20, a storage 1i-30, and a controller 1i-40.

The RF processor 1i-10 may perform functions for transmitting and receiving signals through wireless channels, such as band conversion and amplification of signals. In other words, the RF processor 1i-10 may up-convert a baseband signal provided from the baseband processor 1i-20 into an RF band signal and transmit the same through an antenna and may down-convert an RF band signal received through the antenna into a baseband signal. For example, the RF processor 1i-10 may include a transmission filter, a reception filter, an amplifier, a mixer, an oscillator, a digital-to-analog converter (DAC), and an analog-to-digital converter (ADC). Although only one antenna is illustrated in FIG. 1I, the UE may include a plurality of antennas. Also, the RF processor 1i-10 may include a plurality of RF chains. In addition, the RF processor 1i-10 may perform beamforming. For beamforming, the RF processor 1i-10 may adjust a phase and a magnitude of each of signals transmitted and received through a plurality of antennas or antenna elements.

The baseband processor 1i-20 may perform a function of converting between a baseband signal and a bit string according to the physical layer standard of the system. For example, during data transmission, the baseband processor 1i-20 may generate complex symbols by encoding and modulating a transmission bit stream. Also, during data reception, the baseband processor 1i-20 may restore a received bit stream through demodulation and decoding of the baseband signal provided from the RF processor 1i-10. For example, in the case of the OFDM scheme, when transmitting data, the baseband processor 1i-20 generates complex symbols by encoding and modulating a transmission bit stream, mapping the complex symbols to subcarriers, and configuring OFDM symbols through inverse fast Fourier transform (IFFT) operation and cyclic prefix (CP) insertion. Also, when receiving data, the baseband processor 1i-20 may divide the baseband signal provided from the RF processor 1i-10 into OFDM symbol units, restore the signals mapped to the subcarriers through fast Fourier transform (FFT) operation, and then restore the received bit stream through demodulation and decoding.

The baseband processor 1i-20 and the RF processor 1i-10 may transmit and receive signals as described above. Accordingly, the baseband processor 1i-20 and the RF processor 1i-10 may be referred to as a transmitter, a receiver, a transceiver, or a communicator. Furthermore, at least one of the baseband processor 1i-20 or the RF processor 1i-10 may include a plurality of communication modules to support a plurality of different radio access technologies. Also, at least one of the baseband processor 1i-20 or the RF processor 1i-10 may include different communication modules to process signals of different frequency bands. For example, the different wireless access technologies may include wireless LAN (e.g., IEEE 802.11) and cellular network (e.g., LTE). Also, the different frequency bands may include a super high frequency (SHF) (e.g., 2.5 GHz or 5 GHz) band and an mmWave (e.g., 60 GHz) band.

The storage 1i-30 may store data such as a basic program, an application program, or configuration information for the operation of the UE. Particularly, the storage 1i-30 may store information related to a wireless LAN node performing wireless communication by using the wireless LAN access technology. Also, the storage 1i-30 may provide the stored data at the request of the controller 1i-40.

The controller 1i-40 may control overall operations of the UE. For example, the controller 1i-40 may transmit and receive signals through the baseband processor 1i-20 and the RF processor 1i-10. Also, the controller 1i-40 writes and reads data in the storage 1i-30. For this purpose, the controller 1i-40 may include at least one processor. For example, the controller 1i-40 may include a communication processor (CP) for performing control for communication and an application processor (AP) for controlling a higher layer, such as an application program. According to an embodiment of the disclosure, the controller 1i-40 may include a multiple access processor 1i-42 performing a process for operating in a multiple access mode. For example, the controller 1i-40 may control the UE to perform a procedure shown in the operation of the UE shown in FIG. 1H.

The controller 1i-40 according to an embodiment of the disclosure may indicate the UE to perform the 2-step random access or the 4-step random access according to a type of data for which the random access is triggered, and to perform a corresponding LBT operation according to information received from the BS when transmitting the first message of random access, or predetermined information.

Through the embodiments of the disclosure, when performing a 2-step random access in an unlicensed band, collisions due to contention may be reduced, thereby increasing the probability of success of random access and reducing delay when performing the random access.

Figure 2A:
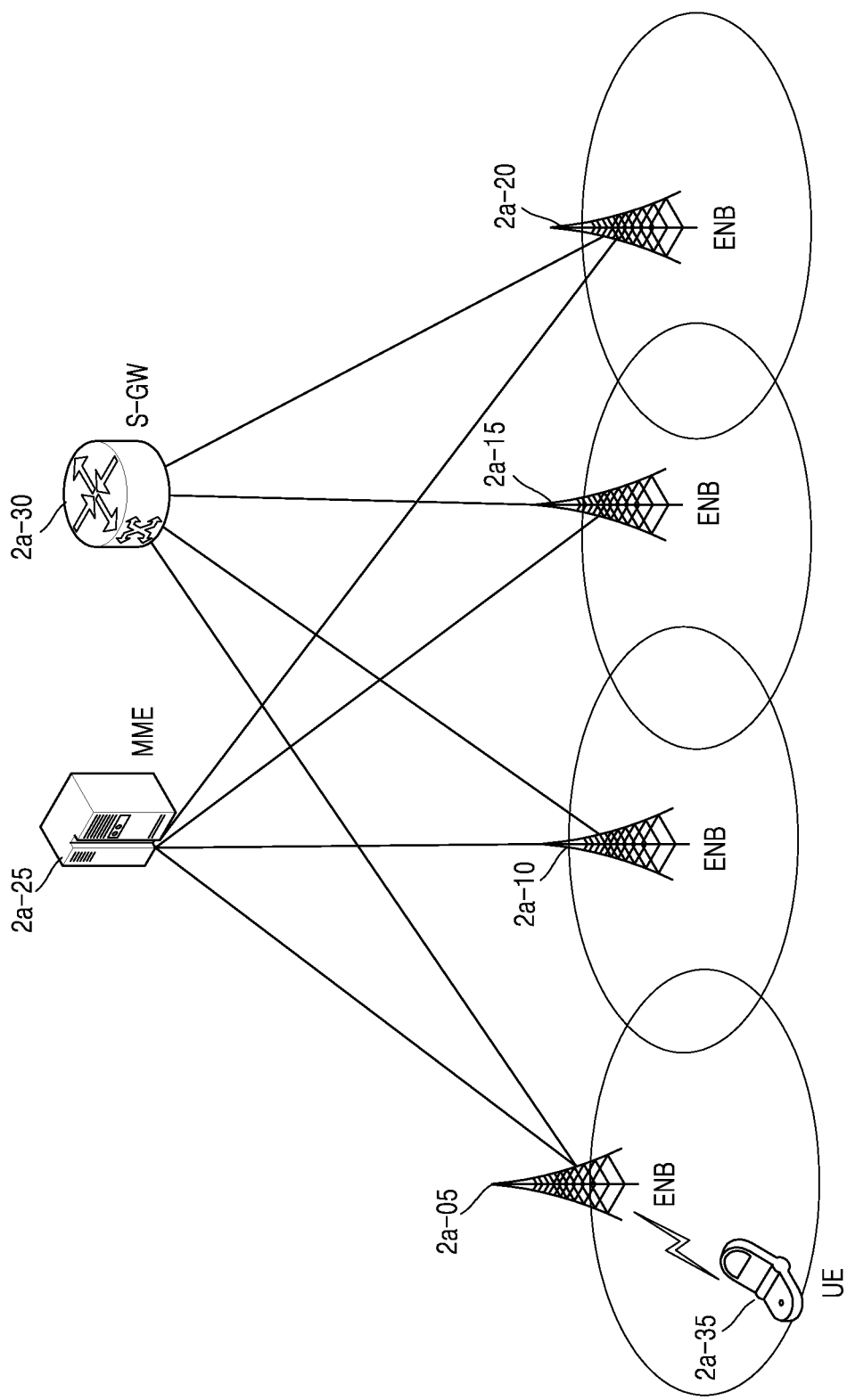
FIG. 2A is a diagram illustrating a configuration of an LTE system according to an embodiment of the disclosure.

FIG. 2A is a diagram illustrating a configuration of an LTE system according to an embodiment of the disclosure. The drawings described with reference to FIG. 2A may also be applied to an NR system.

Referring to FIG. 2A, a wireless communication system may include a plurality of eNBs 2a-05, 2a-10, 2a-15, and 2a-20, a mobility management entity (MME) 2a-25, and a serving gateway (S-GW) 2a-30. A user equipment (hereinafter, "UE" or "terminal") 2a-35 may access an external network through the eNBs 2a-05, 2a-10, 2a-15, and 2a-20 and the S-GW 2a-30.

The eNBs 2a-05, 2a-10, 2a-15, and 2a-20 are access nodes of a cellular network and provide a wireless access to UEs accessing the network. That is, in order to service traffic of users, the eNBs 2a-05, 2a-10, 2a-15, and 2a-20 may collect and schedule status information such as buffer status of UEs, available transmission power status, and/or channel status, thereby supporting connection between UEs and a core network (CN).

The MME 2a-25 is a device capable of performing a mobility management function and a control function on a UE, and may be connected to a plurality of eNBs.

The S-GW 2a-30 is a device that is capable of providing a data bearer.

In addition, the MME 2a-25 and the S-GW 2a-30 may perform authentication, bearer management, or the like for the UE accessing the network and may process packets received from the eNBs 2a-05, 2a-10, 2a-15, and 2a-20 or packets to be transmitted to the eNBs 2a-05, 2a-10, 2a-15, and 2a-20.

Figure 2B:
FIG. 2B is a diagram illustrating a radio protocol architecture in LTE and NR systems, according to an embodiment of the disclosure.

FIG. 2B is a diagram illustrating a radio protocol architecture in LTE and NR systems according to an embodiment of the disclosure.

Referring to FIG. 2B, a radio protocol of the LTE system may be composed of packet data convergence protocols (PDCPs) 2b-05 and 2b-40, radio link controls (RLCs) 2b-10 and 2b-35, and medium access controls (MAC) 2b-15 and 2b-30 in each of the UE and the eNB.

The PDCPs 2b-05 and 2b-40 may perform an operation of compression/decompression of an Internet protocol (IP) header. The RLCs 2b-10 and 2b-35 may reconfigure a PDCP packet data unit (PDU) in an appropriate size. The MAC 2b-15 and 2b-30 may be connected to several RLC layer devices configured in one UE, and may perform an operation of multiplexing RLC PDUs into MAC PDUs and demultiplexing RLC PDUs from MAC PDUs. Physical layers (PHY) 2b-20 and 2b-25 may perform an operation of channel-coding and modulating a higher layer data, generating the higher layer data into orthogonal frequency division multiplexing (OFDM) symbols, and transmitting the OFDM symbols on a radio channel, or may perform an operation of demodulating the OFDM symbols received through the radio channel, channel-decoding the demodulated OFDM symbol, and transmitting the channel-decoded OFDM symbol to the higher layer. Also, a hybrid automatic repeat request (HARQ) is used in the physical layer for additional error correction, and a receiving end may transmit information about whether a packet transmitted from a transmitting end is received, in 1 bit. This may be referred to as HARQ ACK/NACK information. In the case of LTE, DL HARQ ACK/NACK information with respect to UL data transmission may be transmitted by using a physical HARQ indicator channel (PHICH), and in the case of NR, it may be determined whether retransmission is necessary or it is possible to perform retransmission, through scheduling information of a corresponding UE in a physical dedicated control channel (PDCCH) that is a channel on which DL/UL resource allocation or the like is transmitted. This may be because an asynchronous HARQ is applied in NR. UL HARQ ACK/NACK information about DL data transmission may be transmitted through a physical UL control channel (PUCCH) or a physical UL shared channel (PUSCH).

Meanwhile, in LTE, a cell in an eNB using a primary carrier is referred to as a primary cell (PCell), and a cell in an eNB using a subcarrier is referred to as a secondary cell (SCell).

As described below, in general, the PUCCH is transmitted in a UL of the PCell; however, when supported by a UE, the eNB may additionally transmit the PUCCH to the UE in a SCell, which may be referred to as a PUCCH SCell.

Although not shown in the drawings, a radio resource control (RRC) layers exists above each of PDCP layers of the UE and the BS, respectively, and the RRC layers may exchange access and measurement-related configuration control messages for radio resource control.

Meanwhile, the PHY layer may correspond to one or more frequencies/carriers. A technology by which one BS simultaneously configures and uses a plurality of frequencies in one BS may be referred to as carrier aggregation (CA). The CA may increase the amount of transmission by the number of subcarriers by additionally using a primary carrier and one or a plurality of subcarriers, instead of using only one carrier, for communication between the UE and the BS (E-UTRAN NodeB, eNB).

Figure 2C:
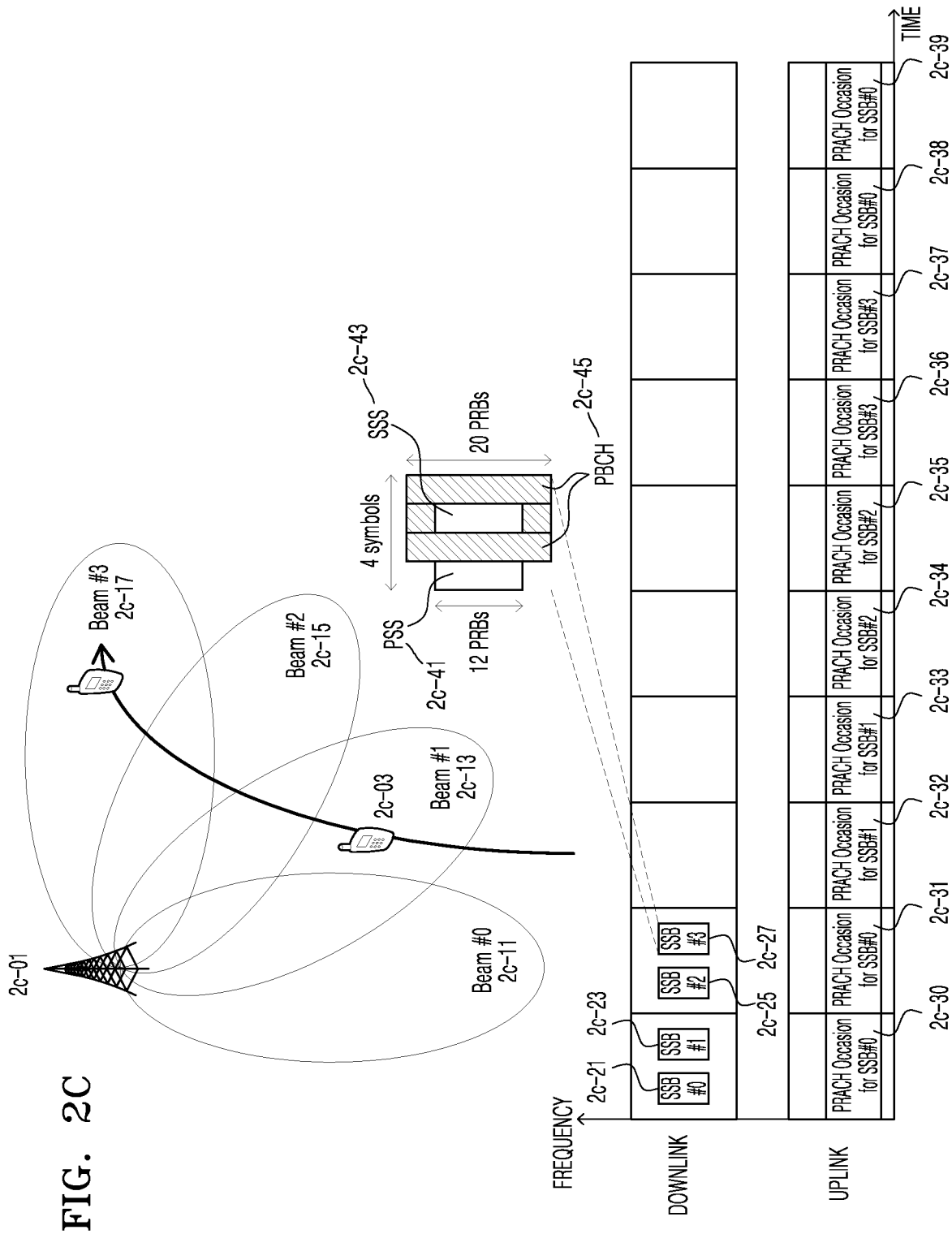
FIG. 2C is a diagram for explaining a configuration of downlink and uplink channel frames when a beam-based communication is performed in an NR system.

FIG. 2C is a diagram for describing DL and UL channel frame structures when a beam-based communication is performed in an NR system.

A BS 21c-01 transmits a signal in a form of beams 2c-11, 2c-13, 2c-15, and 2c-17 for broader coverage or to transmit a stronger signal. Accordingly, a UE 2c-03 within a cell has to transmit and receive data using a certain beam (in the drawings, "beam #1 2c-13") received from the BS.

Meanwhile, a state of a UE is divided into an idle mode (RRC_IDLE) and a connected mode (RRC-CONNECTED) according to whether the UE is connected to the BS. Accordingly, the BS cannot detect a location of a UE in the idle mode RRC_IDLE.

In a case where a UE in the idle mode RRC_IDLE is to be transitioned to the connected mode, the UE receives synchronization signal blocks (SSB) 2c-21, 2c-23, 2c-25, and 2o-27 transmitted from the BS.

The SSB is an SSB signal that is periodically transmitted according to an interval configured by the BS, and each SSB is divided into a primary synchronization signal (PSS) 2c-41, a secondary synchronization signal (SSS) 2c-43, and a physical broadcast channel (PBCH).

In FIG. 2C, a scenario in which SSB is transmitted on each beam is assumed. Specifically, it is assumed that an SSB #0 2c-21 is transmitted by using a beam #0 2c-11, an SSB #1 2c-23 is transmitted by using a beam #1 2c-13, an SSB #2 2c-25 is transmitted by using a beam #2 2c-15, and an SSB #3 2c-27 is transmitted by using a beam #3 2c-17.

In FIG. 2C, a situation in which the UE in the idle mode is positioned in beam #1, but even when the UE in the connected mode performs a random access, the UE may select an SSB that is received at a time when the random access is performed.

Accordingly, the UE may receive SSB #1 transmitted on beam #1. When the UE receives SSB #1, the UE may obtain a physical cell identifier (PCI) of the BS according to PSS and SSS. In addition, by receiving the PBCH, the UE may identify not only an identifier of an SSB currently received (that is, #1) and which position in a 10 ms frame the SSB is received in, but also which system frame number (SFN) having a 10.24 second-interval the SSB is present in.

In addition, the PBCH may include master information block (MIB) therein, and the MIB may inform in which position system information block type 1 (SIB1), which broadcasts more detailed cell configuration information, may be received.

When the UE receives SIB1, the UE may identify a total number of SSBs transmitted by the BS, and the UE may identify a position of a physical random access channel (PRACH) occasion that may perform a random access to transition to the connected mode state. Alternatively, the UE may identify a position of the PRACH occasion capable of transmitting a preamble, which is a specially designed physical signal for UL synchronization. In an embodiment described with reference to FIG. 2C, a scenario in which the location of a PRACH occasion is allocated every 1 ms is assumed, and 2c-30 through 2c-39 are shown.

In addition, based on the information described above, the UE may identify which PRACH occasion is mapped to which SSB index among PRACH occasions. For example, in FIG. 2C, a scenario in which the location of the PRACH occasion is allocated every 1 ms is assumed, and a scenario in which ½ SSB is allocated per PRACH occasion (that is, two PRACH occasions per SSB) is assumed. Accordingly, a scenario in which two PRACH occasions are allocated for each SSB from the start of the PRACH occasion starting according to an SFN value is shown. That is, 2c-30 and 2c-31 may be allocated for SSB #0, and 2c-32 and 2c-33 may be allocated for SSB #1. After the PRACH occasion is configured for all SSBs, the PRACH occasion may be allocated again for the first SSB 2c-38 and 2c-39.

Accordingly, the UE recognizes a position of the PRACH occasion 2c-32 and 2c-33 for SSB #1, and accordingly, transmits a random access preamble to a fastest PRACH occasion (for example, 2c-32) at a current time point among the PRACH occasions 2c-32 and 2c-33 corresponding to SSB #1. Because the BS receives the preamble in PRACH occasion 2c-32, the BS may recognize that the UE has selected SSB #1 to transmit the preamble, and when a subsequent random access is performed, data may be transmitted or received on the beam.

Even when a UE in the connected state moves to a target BS from a current (source) BS due to handover, etc., the UE performs a random access on the target BS, and performs an operation of selecting an SSB to transmit a random access as described above.

Furthermore, during handover of the UE, the BS may transmit a handover command to the UE so that the UE moves from the source BS to the target BS. In this case, the BS may allocate a corresponding UE-dedicated random access preamble identifier to the message for each SSB of the target BS to be used when performing the random access in the target BS.

The BS may not allocate a dedicated random access preamble identifier for all beams (according to a current location of the UE, etc.), and thus, a dedicated random access preamble may not be allocated to some SSBs. For example, dedicated random access preambles may be allocated only to Beams #2 and #3.

In a case where a dedicated random access preamble is not allocated to an SSB the UE selected for transmission of a preamble, the UE may randomly select a contention-based random access preamble and then perform the random access. For example, in the present drawing, after the UE is positioned in Beam #1 for a first time and then performed a random access but failed, when the UE transmits a random access preamble again, the UE may be positioned in Beam #3 and transmit a dedicated preamble.

In other words, when a retransmission of a preamble occurs during one random access procedure, according to whether a dedicated random access preamble is allocated to an SSB selected at every transmission of the preamble, a contention-based random access procedure and a contention-free random access procedure may coexist.

Meanwhile, in order to perform communication in the unlicensed band, data has to be transmitted and received according to regulations established by each country. In more detail, according to the regulations, before a communication device transmits in the unlicensed band, the communication device should 'listen' to determine whether the unlicensed band is occupied by another communication device, and then perform 'transmission' when it is determined that the unlicensed band is not occupied. In this way, the method of listening and transmitting when it is not occupied is called listen-before-talk (LBT). Regulations that have to perform LBT for each country and unlicensed band are determined, and communication devices have to perform LBT when communicating in an unlicensed band according to these regulations.

In general, there are largely Type 1 and Type 2 types in LBT.

Figure 2D:
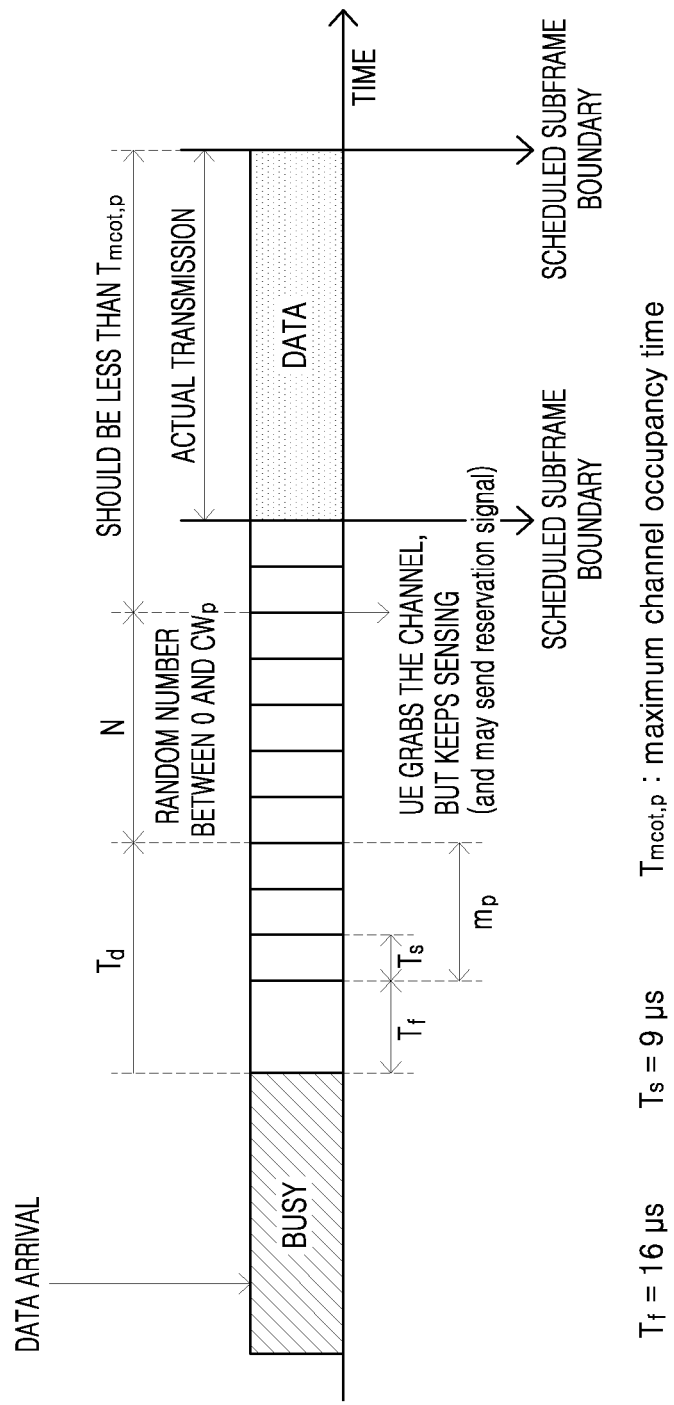
FIG. 2D is a diagram describing LBT type 1.

FIG. 2D is a diagram describing LBT type 1.

LBT Type 1 is a method of randomly determining a time period in which whether other neighboring devices are transmitting is listened before transmission, and transmitting when the channel is not occupied for the random time period. Here, the communication device first listens for a fixed amount of a time $T_d$ and, when unoccupied, the communication device determines whether the channel is not occupied for a random time N.

In this case, the communication device may differentially determine how to determine the values of $T_d$ and N according to priorities and importances of traffics, and there may be a total of four different classes. The class may be referred to as a channel access priority class (CAPC).

Also, according to the CAPC, it has a time length of $T_d=16+m_p*9$ (μs) and has N=random (0, $CW_p$)*9 (μs), and the CW value may start from $CW_{min,p}$ and increase about twice whenever transmission fails and may have a maximum value of $CW_{max,p}$. For example, when the communication device performs LBT by using a CAPC of 3, $T_d$ may have a length of 16+3*9=43 μs and N may have a random value selected between 0 and 15 in the case of initial transmission, and for example, when 7 is selected, N may be 7*9=63 μs and thus the communication device may transmit data when the channel is unoccupied for 106 μs.

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 83, 127, 255, 511, 1023} |

In the above example (that is, when 7 is selected for N), when it is determined that the channel is occupied by another device (i.e., when a received signal strength indicator (RSSI) is greater than or equal to a certain threshold value) while determining whether the channel is unoccupied (e.g., when 3 out of 7 has passed and 4 remains), the UE may wait until the occupancy of the channel ends and still wait for $T_d$ again and then perform transmission after determining whether the channel is unoccupied for the remaining time of 4.

As shown in [Table 2], an LBT scheme with low CAPC is used when transmitting high-priority traffic.

Figure 2E:
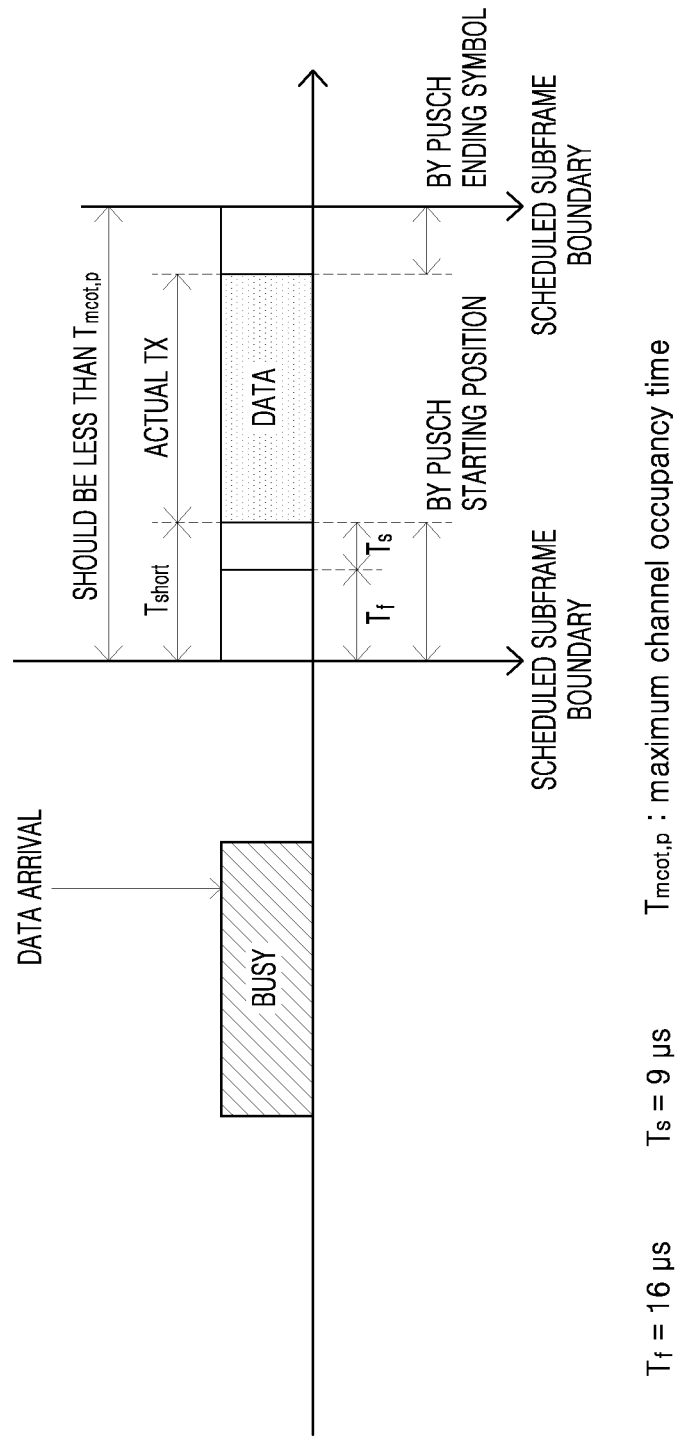
FIG. 2E is a diagram describing LBT type 2.

FIG. 2E is a diagram describing LBT type 2.

LBT Type 2 refers to a scheme by which a time period is fixed, in which whether other neighboring devices are transmitting is listened before transmission, and when the channel is not occupied for the fixed time, a communication device immediately performs transmission. In other words, in FIG. 2E, when the communication device needs to transmit, the communication device listens to (senses) the channel for a fixed period of time $T_{short}$ (=$T_f$+$T_s$) and, when the communication device determines that the channel is not occupied, the communication device transmits data immediately.

This is an LBT scheme that may be used when transmitting signals with very high priority.

Figure 2F:
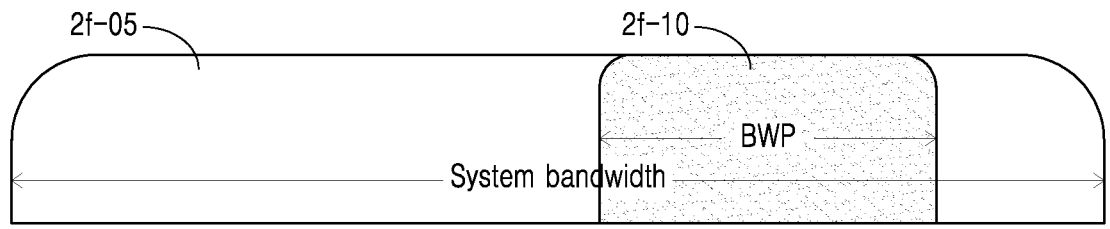
FIG. 2F is a diagram for explaining a scenario in which BandWidth Part (BWP) is applied.
Figure 2F:
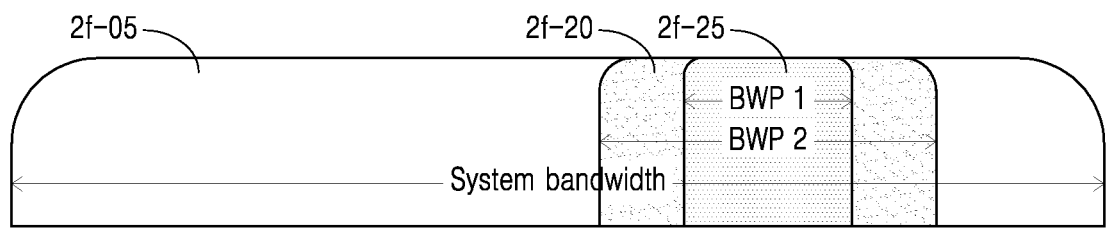
Figure 2F:
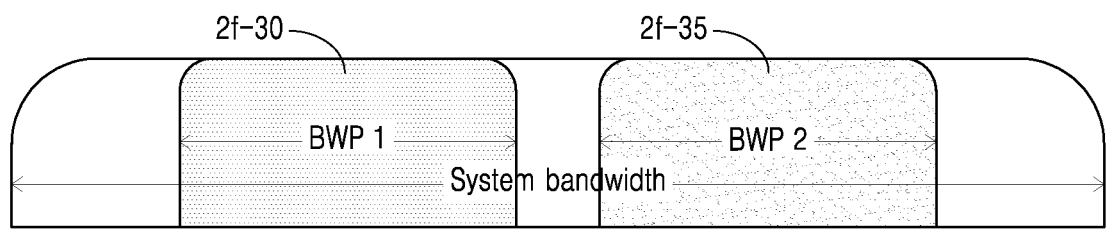

FIG. 2F is a diagram for explaining a scenario in which BandWidth Part (BWP) is applied.

The technique of applying a partial frequency band (BandWidth Part, BWP) means that a UE performs communication by using only a part of a system bandwidth used by one cell. The BWP is used for the purpose of reducing manufacturing costs of UEs or saving power of UEs. The BWP may be configured by the BS only for UEs that support it.

Referring to FIG. 2F, there are three main scenarios for BWP operation.

A first scenario is to apply the BWP for a UE that supports only a frequency bandwidth 2f-10 narrower than a system bandwidth 2f-05 used by one cell. In order to reduce manufacturing costs, a specific UE may be developed to support a limited frequency bandwidth. The UE has to report to the BS that it supports only a limited frequency bandwidth, and the BS configures a BWP of the maximum bandwidth accordingly supported by the UE or less.

A second scenario is to apply BWP for the purpose of UE power saving. For example, even if a UE performs communication using the entire system frequency bandwidth 2f-15 used by one cell or a partial frequency bandwidth 2f-20 thereof, a communication BS may configure a narrower frequency bandwidth 2f-25 for the purpose of power saving.

A third scenario is to apply individual BWPs corresponding to different numerology. Numerology refers to diversifying physical layer configurations in order to implement optimal data transmission according to various service requirements. For example, in an OFDMA configuration composed of a plurality of subcarriers, a distance between the subcarriers may be variably adjusted according to certain requirements. One UE may communicate by applying multiple numerologies at the same time. At this time, because a physical layer configuration corresponding to each numerology may be different, it is preferable to apply each numerology separately as individual BWPs 2f-30 and 2f-35.

In addition, the UE may be configured with a plurality of BWPs, and thereafter, the BS may activate a particular BWP among the configured BWPs. For example, in the third scenario, the UE is configured with BWP 1 2f-30 and BWP 2 2f-35, and the BS may activate one of the two BWPs. Accordingly, the UE may transmit and receive data through the active BWP for each DL and UL in each of the scenarios.

When a plurality of BWPs are configured as described above, the UE may change the activated BWP, which is referred to as BWP switching. This may be done by allocating resources to the BWP to be switched on the PDCCH transmitted by the BS.

Meanwhile, in the unlicensed band, a scenario in which the same numerology is used in the third scenario may also be applied. For example, in the unlicensed band, devices such as wireless LAN may operate with a bandwidth of 20 MHz, and accordingly, multiple BWPs corresponding to a plurality of 20 MHz, such as 2f-30 and 2f-35, may be configured. Thus, UEs may be moved to each BWP according to the congestion level of the unlicensed band.

Figure 2G:
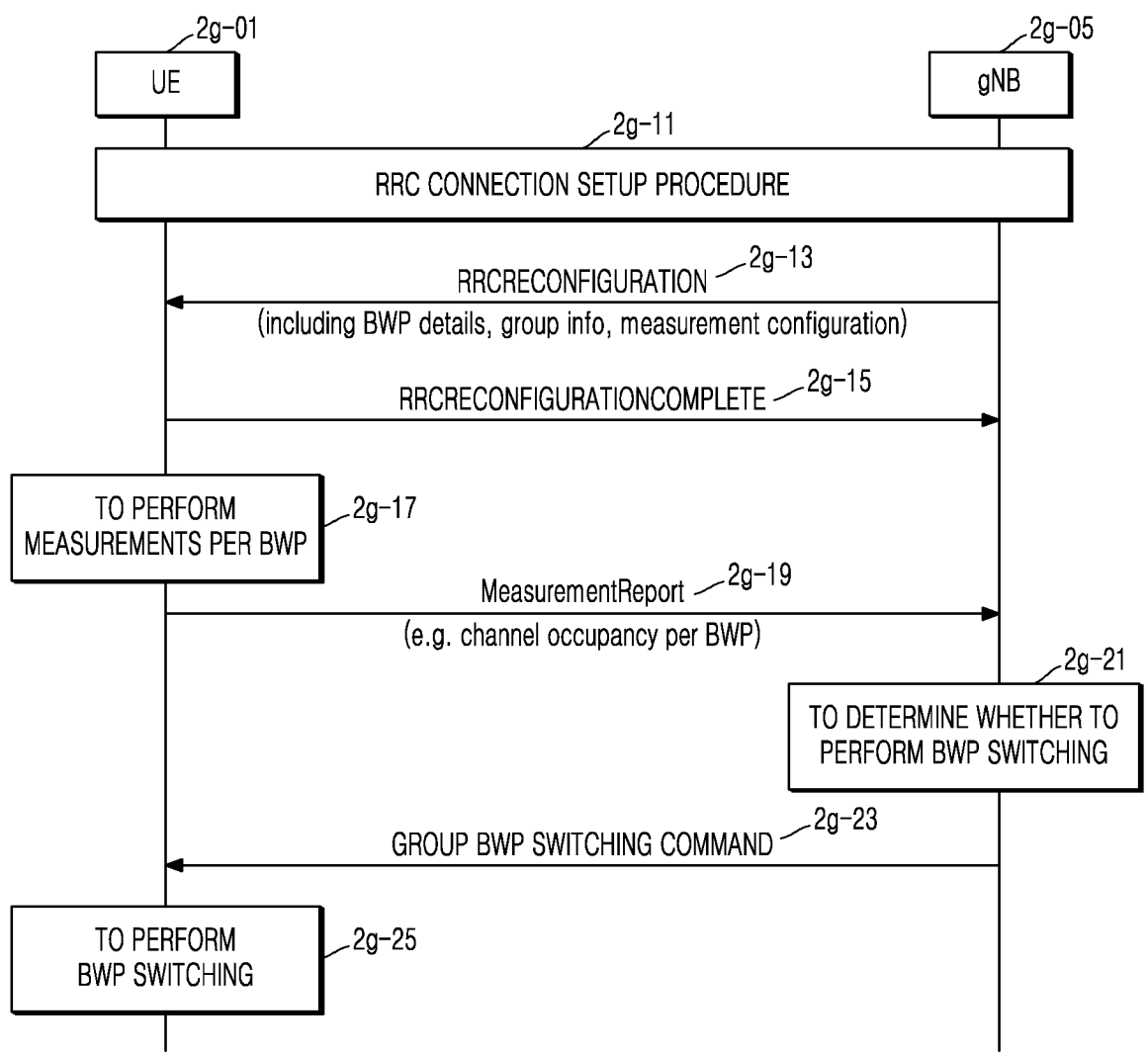
FIG. 2G is a diagram illustrating a flow of messages between a UE and a BS when group BWP switching is performed.

FIG. 2G is a diagram illustrating a flow of messages between a UE and a BS when a group BWP switching is performed.

In FIG. 2G, the UE may be in the idle mode (RRC_IDLE) state and then proceed with a connection setup procedure on the BS for data transmission and reception, in operation 2g-11. For the connection setup procedure, the UE performs a random access on the base station. In the random access operation, the UE transmits a preamble to the BS, receives a response thereto, and then transmits an RRC connection request message of the RRC layer to the BS. In the message transmitted in this operation, other messages may be transmitted depending on the timing at which the UE performs the random access, and all messages transmitted in this operation in random access are collectively referred to as Msg3. Thereafter, the UE goes through a procedure to check whether the Msg3 message is well transmitted from the BS, and at this time, the message transmitted from the BS is referred to as Msg4. When Msg4 is transmitted, the BS may transmit an RRC connection setup message to the UE, and the UE then transmits an RRC connection setup completion message to terminate the connection setup procedure. Alternatively, depending on whether the BS supports it, Msg1 and Msg3 may be simultaneously transmitted, or only Msg3 may be transmitted directly.

Thereafter, the UE may receive, from the BS, information about a BWP to be operated in the BS and measurement configurations for frequencies for respective BWPs, in operation 2g-13.

As described above, the BWP information may include configuration related to a plurality of bandwidths of 20 MHz. In addition, the BWP information may also include information on which BWP is to be indicated by the BWP to be initially operated at the same time as the configuration. In this example drawing, a scenario is assumed, in which a total of two BWPs including BWP #0 and BWP #1 are configured, and the UE operates in BWP #0 from among the two BWPs.

In addition, the measurement configuration may be configured for the UE to measure and report the channel congestion for each of the frequency bands of the BWPs. Specifically, in the configuration message, the BS configures a threshold for 'Received Signal Strength Indicator (RSSI)', and configures the UE to report the percentage of the time exceeding the threshold for each frequency band. For example, when the RSSI is set to −82 dBm and the time of 70% of the measurement interval is greater than −82 dBm, the time may be reported to the BS by measuring which device occupies the corresponding channel. This is called channel occupancy ratio.

In addition, under what conditions to report the measurement results may be configured. For example, the UE may be configured to periodically report a measurement result to the BS, or may be configured to report to the BS when a certain condition is met. For example, when a current signal strength of the BS is less than a configured threshold, the UE may be configured to report the measurement result to the BS.

In addition, the UE may separately receive group information according to a location in which the UE is located. For example, in a case where the UE corresponds to a UE that uses Beam #1 2c-13 in FIG. 2C, the BS may configure a same group for UEs at similar locations (for example, UEs using Beam #1). In the present exemplary drawing, a scenario in which the BS allocates the UE to a first group is assumed, and accordingly, information to be allocated to the first group is also included in the configuration message. A plurality of pieces of the configuration information may be transported through an RRCReconfiguration message of the RRC layer.

Thereafter, the UE may transmit, to the BS, an RRCReconfigurationComplete message indicating acknowledgement of RRC configuration, in operation 2g-15.

Accordingly, while operating in the configured BWP, the UE may measure the channel occupancy for each BWP according to the received configuration information, in operation 2g-17.

When the measurement reporting condition configured by the BS is satisfied, the UE reports the measurement result to the BS, in operation 2g-19. For example, the UE may transmit a channel occupancy report for a frequency band corresponding to the configured BWP #0 and BWP #1.

Thereafter, the BS receives the measurement result reports from various UEs that have been configured to perform the measurement, determines that the congestion level of BWP #0 is greater than or equal to a specific value, and determines that it is necessary to change an operating frequency. For example, the BS determines that the channel congestion is very high for the UEs using Beam #1 2c-13 in FIG. 2C, and may consider a scenario of changing an operation frequency for the UEs using Beam #1 2c-13 in FIG. 2C.

Accordingly, the BS transmits a message to the UEs by using Beam #1 2c-13 in FIG. 2C and commands the UEs to switch an active BWP of the corresponding UEs from a current BWP to BWP #1, in operation 2g-23. The message may be a message that is transmitted by being scrambled by a particular identifier (RNTI) of a PDCCH, or may be a MAC control element (CE) of a MAC layer, or may be a control message of the RRC layer. In the control message, BWP information to be moved (BWP #1) and configured group information may be included. Alternatively, a specific identifier may refer to a group.

Accordingly, UEs belonging to the corresponding group may simultaneously move the operating frequency to BWP #1, in operation 2g-25.

Figure 2H:
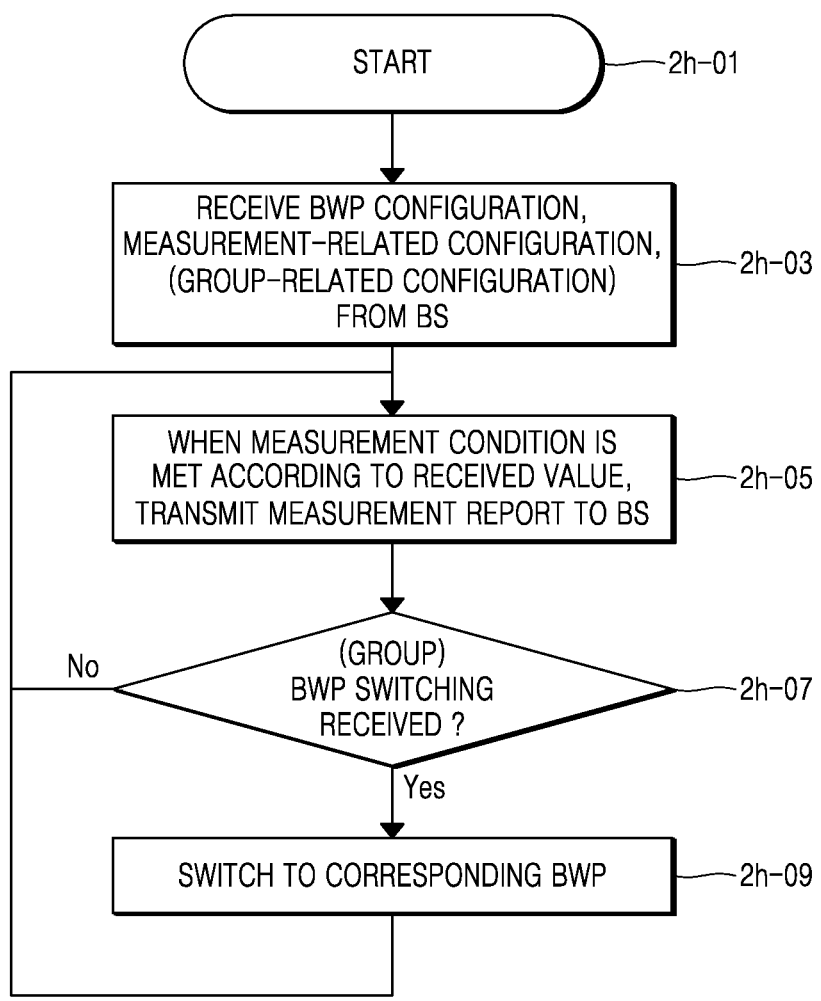
FIG. 2H is a flowchart of operation of a UE when group BWP switching is performed.

FIG. 2H is a flowchart of operation of a UE when a group BWP switching is performed.

In this drawing, it is assumed that the UE is in a connected state (RRC_CONNECTED) with the BS and may transmit and receive data, in operation 2h-01. Thereafter, the UE may receive, from the BS, information about a BWP to be operated in the BS and measurement configuration for frequencies for respective BWPs, in operation 2h-03.

As described above, the BWP information may include configuration related to a plurality of bandwidths of 20 MHz. In addition, the BWP information may also include information on which BWP is to be indicated by the BWP to be initially operated at the same time as the configuration. In this example drawing, a scenario is assumed, in which a total of two BWPs including BWP #0 and BWP #1 are configured, and the UE operates in BWP #0 from among the two BWPs.

In addition, the measurement configuration may be configured for the UE to measure and report the channel congestion for each of the frequency bands of the BWPs. Specifically, in the configuration message, the BS configures a threshold for 'Received Signal Strength Indicator (RSSI)', and configures the UE to report the percentage of the time exceeding the threshold for each frequency band. For example, if the RSSI is set to −82 dBm and the time of 70% of the measurement interval is greater than −82 dBm, the time may be reported to the BS by measuring which device occupies the corresponding channel. This is called channel occupancy.

In addition, under what conditions to report the measurement results may be configured. For example, the UE may be configured to periodically report a measurement result to the BS, or may be configured to report to the BS when a certain condition is met. For example, when a current signal strength of the BS is less than a configured threshold, the UE may be configured to report the measurement result to the BS.

In addition, the UE may separately receive group information according to a location in which the UE is located. For example, in a case where the UE corresponds to a UE that uses Beam #1 2c-13 in FIG. 2C, the BS may configure a same group for UEs at similar locations (for example, UEs using Beam #1). In the present exemplary drawing, it is assumed a scenario in which the BS allocates the UE to a first group, and accordingly, information to be allocated to the first group may also be included in the configuration message. A plurality of pieces of the configuration information may be transported through an RRCReconfiguration message of the RRC layer.

Thereafter, the UE may transmit, to the BS, an RRCReconfigurationComplete message indicating acknowledgement of RRC configuration.

While operating in the configured BWP according to a configured value, the UE may measure the channel occupancy for each BWP according to the received configuration information, in operation 2h-05. When the measurement reporting condition configured by the BS is satisfied, the UE may report the measurement result to the BS. For example, the UE may transmit a channel occupancy report for a frequency band corresponding to the configured BWP #0 and BWP #1.

Thereafter, when the UE receives, from the BS, a group BWP switching message for a group (group 1) to which the UE belongs, in operation 2h-07, the UE switches to the corresponding BWP, in operation 2h-09. In this case, the group BWP switching message may be a message that is transmitted by being scrambled by a particular identifier (RNTI) of a PDCCH, or may be a MAC CE that is a control message of the MAC layer, or may be a control message of the RRC layer. In the control message, BWP information to be moved (BWP #1) and configured group information may be included. Alternatively, a specific identifier may refer to a group. Accordingly, UEs belonging to the corresponding group may simultaneously move the operating frequency to BWP #1.

Figure 2I:
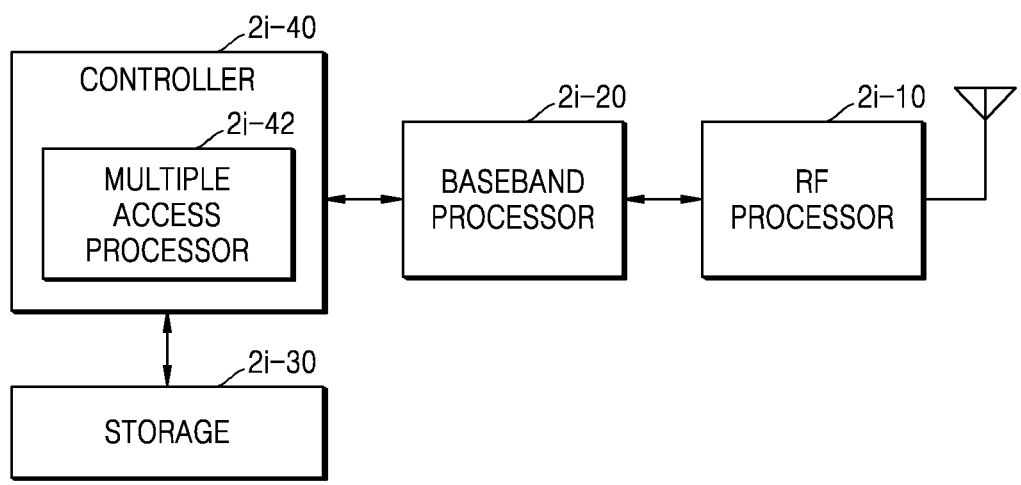
FIG. 2I is a diagram illustrating a block configuration of a UE in a wireless communication system, according to an embodiment of the disclosure.

FIG. 2I is a diagram illustrating a block configuration of a UE in a wireless communication system according to an embodiment of the disclosure.

According to an embodiment of the disclosure, the UE may include a radio frequency (RF) processor 2i-10, a baseband processor 2i-20, a storage 2i-30, and a controller 2i-40.

The RF processor 2i-10 may perform functions for transmitting and receiving signals through wireless channels, such as band conversion and amplification of signals. In other words, the RF processor 2i-10 may up-convert a baseband signal provided from the baseband processor 2i-20 into an RF band signal and transmit the same through an antenna and may down-convert an RF band signal received through the antenna into a baseband signal. For example, the RF processor 2i-10 may include a transmission filter, a reception filter, an amplifier, a mixer, an oscillator, a digital-to-analog converter (DAC), and an analog-to-digital converter (ADC). Although only one antenna is illustrated in FIG. 2I, the UE may include a plurality of antennas. Also, the RF processor 2i-10 may include a plurality of RF chains. In addition, the RF processor 2i-10 may perform beamforming. For beamforming, the RF processor 2i-10 may adjust a phase and a magnitude of each of signals transmitted and received through a plurality of antennas or antenna elements.

The baseband processor 2i-20 may perform a function of converting between a baseband signal and a bit string according to the physical layer standard of the system. For example, during data transmission, the baseband processor 2i-20 may generate complex symbols by encoding and modulating a transmission bit stream. Also, during data reception, the baseband processor 2i-20 may restore a received bit stream through demodulation and decoding of the baseband signal provided from the RF processor 2i-10. For example, in the case of the OFDM scheme, when transmitting data, the baseband processor 2i-20 generates complex symbols by encoding and modulating a transmission bit stream, mapping the complex symbols to subcarriers, and configuring OFDM symbols through inverse fast Fourier transform (IFFT) operation and cyclic prefix (CP) insertion. Also, when receiving data, the baseband processor 2i-20 may divide the baseband signal provided from the RF processor 2i-10 into OFDM symbol units, restore the signals mapped to the subcarriers through fast Fourier transform (FFT) operation, and then restore the received bit stream through demodulation and decoding.

The baseband processor 2i-20 and the RF processor 2i-10 may transmit and receive signals as described above. Accordingly, the baseband processor 2i-20 and the RF processor 2i-10 may be referred to as a transmitter, a receiver, a transceiver, or a communicator. Furthermore, at least one of the baseband processor 2i-20 or the RF processor 2i-10 may include a plurality of communication modules to support a plurality of different radio access technologies. Also, at least one of the baseband processor 2i-20 or the RF processor 2i-10 may include different communication modules to process signals of different frequency bands. For example, the different wireless access technologies may include wireless LAN (e.g., IEEE 802.11) and cellular network (e.g., LTE). Also, the different frequency bands may include a super high frequency (SHF) (e.g., 2.5 GHz or 5 GHz) band and an mmWave (e.g., 60 GHz) band.

The storage 2i-30 may store data such as a basic program, an application program, or configuration information for the operation of the UE. Particularly, the storage 2i-30 may store information related to a wireless LAN node performing wireless communication by using the wireless LAN access technology. Also, the storage 2i-30 may provide the stored data at the request of the controller 2i-40.

The controller 2i-40 may control overall operations of the UE. For example, the controller 2i-40 may transmit and receive signals through the baseband processor 2i-20 and the RF processor 2i-10. Also, the controller 2i-40 writes and reads data in the storage 2i-30. For this purpose, the controller 2i-40 may include at least one processor.

For example, the controller 2i-40 may include a communication processor (CP) for performing control for communication and an application processor (AP) for controlling a higher layer, such as an application program. According to an embodiment of the disclosure, the controller 2i-40 may include a multiple access processor 2i-42 performing a process for operating in a multiple access mode.

The controller 2i-40 according to an embodiment of the disclosure may perform measurement and reporting according to the configurations received from the BS, and when the group BWP switching is received from the BS, the controller 21-40 may operate by changing the BWP accordingly.

Through the embodiments of the disclosure, the BS may improve communication speed by rapidly switching UEs in a cell to a channel that is not congested.

The methods according to the embodiments of the disclosure described in the specification or the claims may be implemented by hardware, software, or a combination thereof.

When the methods are implemented by software, a computer-readable storage medium may be provided to store one or more programs (software modules). The one or more programs stored in the computer-readable storage medium may be configured for execution by one or more processors in an electronic device. The one or more programs may include instructions for causing the electronic device to execute the methods according to the embodiments of the disclosure described in the specification or the claims.

These programs (software modules or software) may be stored in random access memories (RAMs), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Also, the programs may be stored in a memory configured by a combination of some or all of such storage devices. Also, each of the memories may be provided in plurality.

Also, the programs may be stored in an attachable storage device that may be accessed through a communication network such as Internet, Intranet, local area network (LAN), wide LAN (WLAN), or storage area network (SAN), or through a communication network configured by any combination thereof. Such a storage device may be connected through an external port to an apparatus performing an embodiment of the disclosure. Also, a separate storage device on a communication network may be connected to an apparatus performing an embodiment of the disclosure.

In the above particular embodiments of the disclosure, the components included in the disclosure are expressed in the singular or plural according to the presented particular embodiments of the disclosure. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

Meanwhile, although embodiments have been described in the detailed description of the disclosure, various modifications are possible without departing from the scope of the disclosure. Therefore, the scope of the disclosure should not be determined limited to the described embodiments, and should be determined by the scope of the following claims as well as the equivalents of the scope of the claims.

The invention claimed is:

1. A method of performing a random access of a user equipment (UE) in a wireless communication system, the method comprising:
  receiving, from a base station (BS), configuration information related to the random access;
  identifying whether the random access is triggered to transmit a message related to a common control channel (CCCH) or to transmit a message related to a dedicated control channel (DCCH):
  in case that the random access is triggered to transmit the message related to the DCCH, identifying whether a two-step random access procedure is allowed for the DCCH based on the configuration information; and
  in case that the two-step random access procedure is allowed for the DCCH, performing, the two-step random access procedure.

2. The method of claim 1, further comprising:
  in case that the random access is triggered to transmit the message related to the CCCH, performing one of the two-step random access procedure and a four-step random access procedure based on a priority of the CCCH.

3. The method of claim 1, further comprising:
  in case that the random access is triggered to transmit the message related to the CCCH, performing the two-step random access procedure.

4. The method of claim 1, further comprising:
  in case that the two-step random access procedure is not allowed for the DCCH, performing a four-step random access procedure.

5. The method of claim 1, further comprising:
  in case that the random access is triggered to transmit the message related to a dedicated traffic channel (DTCH), identifying whether a two-step random access procedure is allowed for the DTCH based on the configuration information; and
  in case that the two-step random access procedure is allowed for the DTCH, performing the two-step random access procedure.

6. The method of claim 1, wherein the configuration information related to the random access comprises at least one of resource information for transmitting a first message of the two-step random access procedure or physical random access channel (PRACH) resource information for performing a four-step random access procedure.

7. A user equipment (UE) performing a random access in a wireless communication system, the UE comprising:
a transceiver; and
a controller configured to:
receive, from a base station (BS) via the transceiver, configuration information related to the random access,
identify whether the random access is triggered to transmit a message related to a common control channel (CCCH) or to transmit a message related to a dedicated control channel (DCCH),
in case that the random access is triggered to transmit the message related to the DCCH, identify whether a two-step random access procedure is allowed for the DCCH, based on the configuration information, and
in case that the two-step random access procedure is allowed for the DCCH, perform the two-step random access procedure.

8. The UE of claim 7, wherein the controller is further configured to:
in case that the random access is triggered to transmit the message related to the CCCH, perform one of the two-step random access procedure and a four-step random access procedure based on a priority of the CCCH.

9. The UE of claim 7, wherein the controller is further configured to:
in case that the random access is triggered to transmit the message related to the CCCH, perform the two-step random access procedure.

10. The UE of claim 7, wherein the controller is further configured to:
in case that the two-step random access procedure is not allowed for the DCCH, perform a four-step random access procedure.

11. The UE of claim 7, wherein the controller is further configured to:
in case that the random access is triggered to transmit the message related to a dedicated traffic channel (DTCH), identify whether a two-step random access procedure is allowed for the DTCH based on the configuration information, and
in case that the two-step random access procedure is allowed for the DTCH, perform the two-step random access procedure.

12. The UE of claim 7, wherein the configuration information related to the random access comprises at least one of resource information for transmitting a first message of the two-step random access procedure or physical random access channel (PRACH) resource information for performing a four-step random access procedure.

* * * * *